United States Patent [19]

Pesando et al.

[11] Patent Number: 4,786,014
[45] Date of Patent: Nov. 22, 1988

[54] HELICOPTER RAPID SECURING & TRAVERSING SYSTEM

[75] Inventors: Mario Pesando; Boris Velman, both of Mississauga, Canada

[73] Assignee: Indal Technologies Inc., Mississauga, Canada

[21] Appl. No.: 915,698

[22] Filed: Oct. 6, 1986

[30] Foreign Application Priority Data

Nov. 4, 1985 [CA] Canada .................................. 494,567

[51] Int. Cl.$^4$ ............................................. B64F 1/22
[52] U.S. Cl. ................................................ 244/115
[58] Field of Search .................. 244/114 R, 115, 116, 244/110 E; 280/508, 510; 294/82.33; 114/261

[56] References Cited

U.S. PATENT DOCUMENTS

| | | | |
|---|---|---|---|
| 763,771 | 6/1904 | Lukens et al. | 280/508 |
| 1,200,715 | 10/1916 | Edwards | 280/508 |
| 2,248,005 | 7/1941 | Lyman | 280/510 |
| 3,052,487 | 9/1962 | Harbers et al. | 280/508 |
| 3,552,688 | 1/1971 | Baekken | 244/115 |
| 3,659,813 | 5/1972 | Mesnet et al. | 244/116 |
| 4,123,020 | 10/1978 | Kovsak | 244/116 |
| 4,319,722 | 3/1982 | Pesando | 244/116 |

Primary Examiner—Galen Barefoot
Attorney, Agent, or Firm—Ivor M. Hughes

[57] ABSTRACT

A helicopter rapid securing and traversing system for securing a helicopter upon landing on the deck of a ship for subsequently traversing it from its landing position, the system comprising a housing reciprocal from a position remote the landing area to a position adjacent the landing area of the helicopter, the housing carrying a shock absorber and sensing structure extending across the housing for contacting a probe or other projection extending from the helicopter on the exterior of the helicopter when the helicopter has landed on the deck of the ship and the housing is brought to engage the probe or other projection, the shock absorbing bar and sensing structure for slowing and stopping the movement of the housing when the probe or projection is engaged and for cushioning the engagement and for sensing the position of the probe or projection, a carrier on the housing extending across the housing and carrying a securing structure thereon for securing the housing to the probe or projection on the helicopter, the structure for securing being normally secured at one side of the housing on the carrier and being moved laterally along the carrier across the housing when the carrier is activated to capture the probe or projection, the structure for securing carrying a laterally opening mouth opening in the direction towards the probe for grasping the probe on the helicopter's end.

116 Claims, 12 Drawing Sheets 4,786,014

HELICOPTER RAPID SECURING & TRAVERSING SYSTEM

FIELD OF INVENTION

This invention relates to the recovery of helicopters on board a ship and find particular application to the shipboard securing of such helicopters upon landing and their traversing to storage.

BACKGROUND OF THE INVENTION

Helicopters have now become entrenched as an integral part of the weapons system carried by destroyers and frigates in anti-submarine search and strike capacity. Invariably, landings and take-offs of these helicopters from vessels must be made in moderate to severe turbulence and once on the deck, the helicopter must be quickly secured and stored for protection from the environment.

Such helicopters are the Sea Hawk (t.m.) and Sea King (t.m.).

The Sea King, a 20,000 pound helicopter, includes a conventional undercarriage comprising a rear wheel free wheeling through 360 degrees and a pair of spaced dual wheel units on either side, and near the nose of the helicopter. For recovery, employing the RAST System (Recovery Assist Secure and Traverse System) for helicopter recovery, the Sea King mounts externally on its underside an airborne messenger winch intermediate the rear wheel and a pair of dual wheel units. The messenger which holds a light duty cable with a messenger link and lock assembly for the flydown cable. When the flydown cable from the self-centering and self-balancing sliding bell mouth is secured to the messenger winch, a constant tension is maintained in the cable until the helicopter is landed safely. Once the helicopter has landed an increased tension is applied automatically by the electric tension winch for securing the helicopter.

After landing, the Sea King helicopter is moved into the hangar.

In Canadian Letters Patent No. 781,808 a helicopter rapid securing system is disclosed employing a constant tension winch used to maintain the tension in the cable securing the airborne helicopter to the ship and a frame surrounding the fairlead through which the cable extends below deck, supporting two parallel arresting rails for firing towards one another from opposite sides to the frame to capture the probe of the helicopter securing the cable to the helicopter when the helicopter has landed to secure the helicopter to the deck. Thereafter, the frame is withdrawn along the track traversing the Sea King helicopter to the hangar.

Of the known methods of securing and traversing a helicopter, the method described in Canadian Letters Patent No. 781,808 is the fastest and most reliable. It is also the most expensive. Additionally, because the capture and traverse functions are carried out by the same structure involved in helicopter haul-down, it is also safe. When the helicopter lands, not only is it secured to the ship's deck, it is also simultaneously secured to the traverser used for traversing it to the hangar. However, the said structure is complex and costly both to buy and maintain. Additionally, because the arresting beams are fired from opposite sides of the frame to engage the probe within the confines of the frame, the landing area is fixed in size.

U.S. Pat. No. 4,123,020 teaches an arm carrying a pair of digits arranged to move on a track by means of a right and left screw jack which is driven by a hydraulic motor. Each of the digits carries clamping jaws to secure the stud of the VTOL between the digits. This structure is not practical. Neither is the structure shown in U.S. Pat. No. 4,420,132. The scissors action of the arms may damage the probes.

U.S. Pat. No. 3,659,813 discloses the use of a trolley to which a helicopter is secured for traversing once on the deck of a ship. The trolley is displaceable along a worm gear mounted on the cross strut driven in a linear path by a drive mechanism. However, this system cannot be used to rapidly secure the helicopter on landing. It is merely a type of traversing device.

It is therefore an object of this invention to provide a helicopter rapid securing and traversing system and components and sub-assemblies therefor, which overcome the aforementioned difficulties with the prior systems and which are used to reliably and safely capture the probe of the helicopter time after time within a very short time (in the order of 1 to 2 seconds) without damaging the probe.

Further and other objects of the invention will be realized by those skilled in the art and from the following summary of the invention and detailed description of preferred embodiments thereof.

SUMMARY OF THE INVENTION

According to one aspect of the invention, a helicopter rapid securing and traversing system for securing a helicopter upon landing on the deck of a ship for subsequently traversing it from its landing position, said system comprising a housing reciprocal from a position remote the landing area to a position adjacent the landing area of the helicopter (for example, in a track) the housing carrying a shock absorber and sensing means extending across the housing for contacting a probe or other projection (such as a wind housing) extending from the helicopter on the exterior of the helicopter when the helicopter has landed on the deck and the housing is brought to engage the probe or other projection, the shock absorbing bar and sensing means for slowing and stopping the movement of the housing when the probe or projection is engaged and for cushioning the engagement (as for example, to engage a switch turning off the electrical power to a motor used to move the housing to the helicopter landing area) and for sensing the position of the probe or projection, the sensing means in one embodiment being incorporated with the shock absorber in one structure, and in another embodiment being separate from the shock absorber and being a sensing bar which extends parallel to the carrier and shock absorber and being positioned along the centre line of a laterally opening mouth of securing means for securing to the probe or projection carried by a carrier on the housing in either case to stop the probe in a position along the centre line of the mouth, means for reciprocating the housing towards and away from the landing area, a carrier on the housing and carrying securing means thereon for securing the housing to the probe or projection on the helicopter, (in a preferred embodiment being a lead screw extending across the housing, and in another embodiment, either a hydraulically or electrically driven chain), the securing means being normally secured at one side of the housing on the carrier and being moved laterally along the carrier across the housing when the carrier is activated to capture the probe or projection, the securing means carrying a laterally opening mouth opening in the direction towards the probe, and means to operate the carrier (in one embodiment where the carrier for the securing means comprises a lead screw, the means to operate the lead screw comprises a high speed electric motor for turning the lead screw to move the securing means therealong by reciprocal means on the securing means engaging the lead screw and a slow speed high torque electric motor for turning the lead screw once the probe is grasped by the securing means, means to deactivate the high speed motor when the probe is grasped by the securing means but not lock the motor, permitting it to free wheel and a clutch for connecting the slow speed high torque electric motor to the lead screw when the high speed motor is deactivated), whereby when the probe or projection engages the shock absorber and sensing means, the impact of the probe is cushioned and the position of the probe or projection is sensed relative to the mouth of the securing means whereby when the probe is sensed as positioned in line with the mouth of the securing means, the carrier moves the securing means to grasp and secure the probe or projection and when the probe is sensed not to be appropriately positioned, the system is activated to cause the system to be appropriately positioned relative to the probe.

According to another aspect of the invention, a helicopter rapid securing and traversing system is provided for securing the helicopter upon landing on the deck of the ship and for subsequently traversing it from its landing position, said system comprising:

a housing reciprocal from a position remote the landing area to a position adjacent the landing area of a helicopter (for example, in a track) carrying a shock absorbing bar extending across the housing for engaging a probe or other projection (such as a winch housing) extending from the helicopter on the exterior of the helicopter when the helicopter has landed on the deck of the ship and the housing is brought to engage the probe or other projection, the shock absorbing bar for cushioning the impact of the probe or other projection when the probe or other projection engages the shock absorbing bar carried by the housing to slow and stop the movement of the housing (as for example, to engage a switch turning off the electrical power to a motor used to move the housing to the helicopter landing area);

means for reciprocating the housing towards and away from the landing area;

a carrier on the housing extending parallel to the shock absorbing bar but closer to the housing than the shock absorbing bar (in a preferred embodiment being a lead screw extending across the housing, and in another embodiment, either a hydraulically driven or electrically driven chain drive);

the carrier carrying securing means thereon for securing the housing to the probe or other projection on the helicopter, the securing means being normally secured to one side of the housing on the carrier for being moved laterally from one side of the housing towards the other side when the carrier is activated to move laterally across the housing, to capture the probe or projection;

the securing means carrying a laterally opening mouth opening in the direction towards the probe;

sensing means for sensing the position of the probe relative to the mouth of the securing means whereby when the probe is sensed to be positioned in line with the mouth of the securing means the housing is stopped so that when the securing means is moved by the carrier, the securing means will grasp and secure the probe or projection and when the sensing means senses the probe is not appropriately positioned (as for example, when the helicopter and thus the probe has moved away), the system is activated to cause the system to be appropriately positioned relative to the probe), (the sensing means in one embodiment being a sensing bar which extends parallel to the carrier and shock absorbing bar and is positioned closer to the housing than the shock absorbing bar and being positioned along the centre line of the laterally opening mouth of the securing means and in one embodiment the sensing means being incorporated with the shock absorbing bar in one structure, in both embodiments to stop the system in a position wherein the probe is along the centre line of the mouth, for example, by depressing and causing a switch to be engaged, stopping movement of the housing when the housing is slowed down and stopped when the probe or other projection is engaged permitting the carrier to move the securing means laterally across the housing to capture the probe); means to operate the carrier (in one embodiment where the carrier for the securing means comprises a lead screw, the means to operate the lead screw comprises a high speed electric motor for turning the lead screw to move the securing means therealong by reciprocal means on the securing means engaging the lead screw and a slow speed high torque electric motor for turning the lead screw once the probe is grasped by the securing means, means to deactivate the high speed motor when the probe is grasped by the securing means but not lock the motor permitting it to free wheel, and a clutch for connecting the slow speed high torque electric motor to the lead screw when the high speed motor is deactivated.

According to another aspect of the invention, securing means may be provided on a carrier moveable to grasp the probe or other projection of a helicopter in a helicopter rapid securing and traversing system (as for example, a system previously described), the securing means being normally partialy opened when it does not secure the probe ot other projection and being moveable from the normally partially opened position to a fully closed position when it grasps the probe and being moveable to a fully opened position whereat it is able to fully release the probe. In one embodiment when the securing means is fully closed, the operation of the carrier at high speed for grasping the probe or other projection is precluded and an indicator (for example, lights or flags) indicates the securing means is closed.

When the securing means is carried on a lead screw, and the lead screw is connected for moving the securing means along the lead screw for grasping the probe or other projection by an electrical high speed motor, when the securing means is fully closed after having grasped the probe or other projection, the electrical high speed motor is disengaged from electrical operation (as by a switch) until the securing means is either in its fully open position or normally partially opened position. When the electrical high speed motor is diesngaged (when the securing means is fully closed) a low speed high torque may be operationally engaged with the lead screw for use to manoeuver and manipulate the securing means and probe or other projection and thus the helicopter for traversing of the helicopter.

For the purposes of providing the securing means moveably from a normally partially opened position to a fully closed position (whereat it grasps the probe) to a fully opened position (whereat it is able to fully release the probe), the securing means comprises a body carrying a probe or other projection-receiving recess and a pair of arms extending laterally across the traverser, on either side of the recess, at least one arm (and in the preferred embodiment only one arm), being movable (for example, pivotable) towards the other arm (each arm preferably carrying at its leading end sloped surfaces sloping towards the other arm and towards the rear of the body), the at least preferably one moveable (pivotable) arm being urged to a closed position to preclude the probe or other projection from leaving the recess when the securing means is closed, means, for example, a a finger or pawl secured to the body at least one portion normally being positioned to extend between the at least one (pivotable) arm and the body for spacing the arm and body, and at least another portion extending into the probe or other projection-receiving recess whereat the securing means is in its normally partially opened position and whereby the mouth opening between the at least one moveable (pivotable) arm and the other arm (and which arm may form a lateral extension of the body) is less than the width of the probe or other projection and when the probe or projection is in the probe or other projection-receiving recess the means, for example, a finger or pawl is moved, for example, pivoted against the action of a spring out of its position spacing the body and the preferably at least one pivotable arm whereby the at least one pivotable arm and thus the securing means is closed presenting no mouth opening or a mouth opening less than the width of the probe or other projection, and whereby when the moveable (preferably pivotable) arm is pivoted to a position whereby the space between the body and preferably pivotable arm forming the mouth of the securing means is greater than the width of the probe or other projection for releasing the probe and whereby when the probe or other projection is released from the probe-receiving recess, the means, for example, a finger or pawl moves preferably against the action of the spring and positions a portion thereof between the body and the preferably at least one pivotable arm so that when the probe is fully released and the preferably at least one pivotable arm moves (pivots) towards the body and towards the other arm, the means, for example, a finger or pawl blocks further movement, thus returning the securing means to its normally partially opened position.

The preferably at least one pivotable arm may be secured for pulling and pushing it towards and away from the body thus attempting to close and open the securing means respectively. In one embodiment, this may be accomplished by a spring-loaded shaft carrying a lot in which a follower (in one form a plate) may be carried preferably pivoted as the shaft moves the arm from an opened to a closed position.

The follower may in turn carry a non-circular (for example, square, rectangular, elliptical) opening through which a rod of a like non-circular shape and size passes. Therefore, as the follower rotates, the rod rotates. The rod can be so attached to an indicator means (for example, to proximity switches, turn on/of devices) to indicate whether the securing means is open or closed. The rod may also be connected to an activator which may rotate the rod, rotating the follower, shaft and thus the preferably at least one pivotable arm to open and close the securing means to the normally partially open position. The activator may be fully retractable from rotating the rod and an indicator may be provided identifying that the activator has been fully retracted.

BRIEF DESCRIPTION OF THE DRAWINGS

The invention will now be illustrated with respect to the following drawings illustrating a preferred embodiment of the invention in which.

DETAILED DESCRIPTION OF PREFERRED EMBODIMENTS OF THE INVENTION

Figure 1:
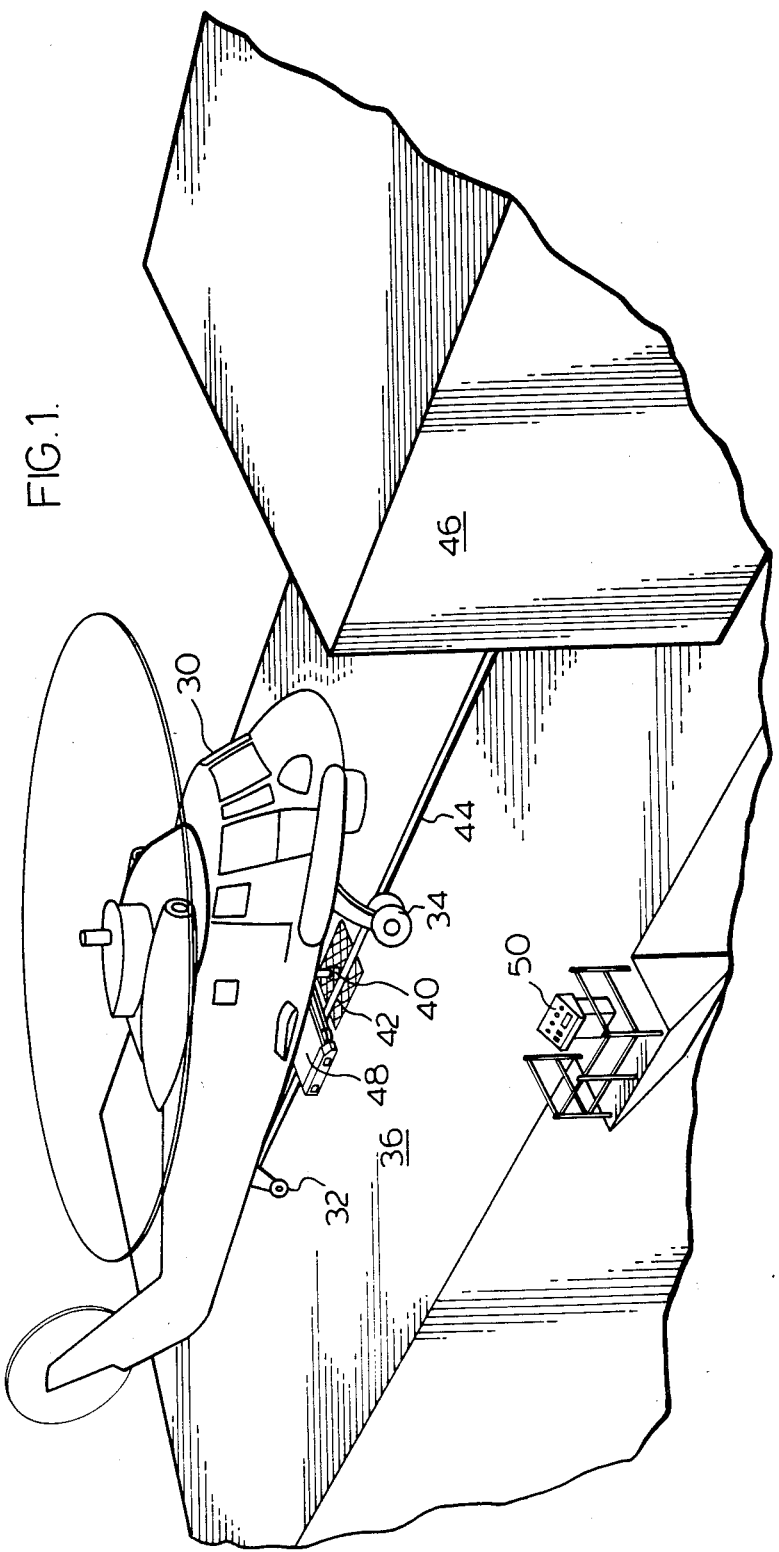
FIG. 1 is a perspective schematic view of a helicopter landing on a frigate incorporating a helicopter rapid securing and traversing system according to the preferred embodiment of the invention.

With reference to FIG. 1, Sea Hawk Helicopter 30 comprising a free wheeling rear wheel 32 and a pair of forward dual wheel units 34 on either side below and near the nose has landed on deck 36 of frigate 38 with probe 40 in landing area 42 through which track 44 passes from the rear of the frigate to the hangar. The deck 36 supports a hangar 46 into which the helicopter 30 when secured to traversing system 48, will be traversed along track 44. Deck 36 also supports a control console 50 for controlling the traversing system 48 and the components thereof.

Figure 8:
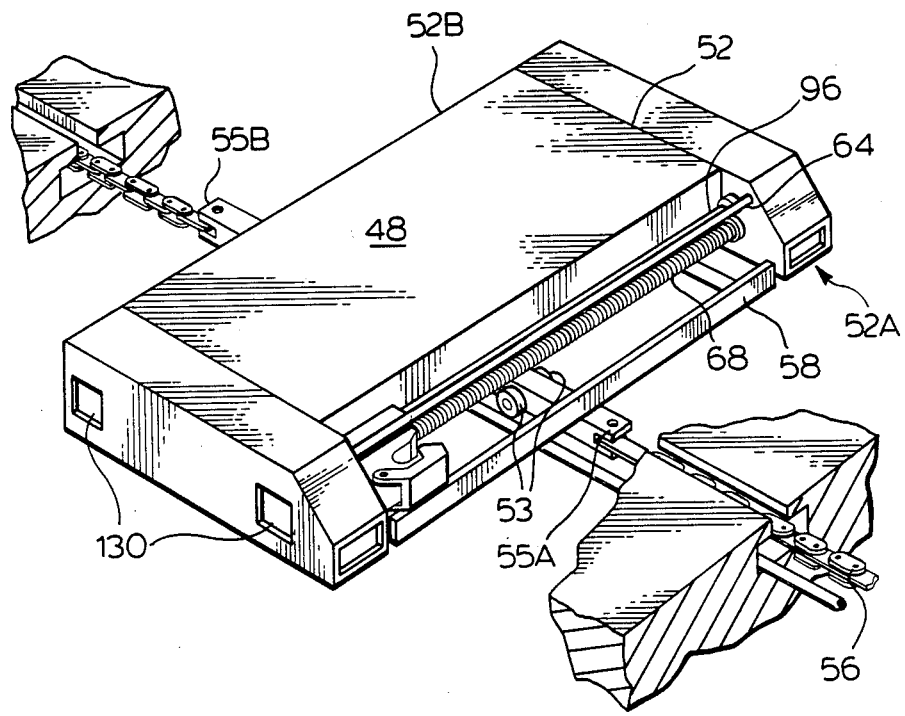
FIG. 8 is a perspective view partly in section illustrating part of the helicopter rapid securing and traversing system of FIG. 1.
Figure 9:
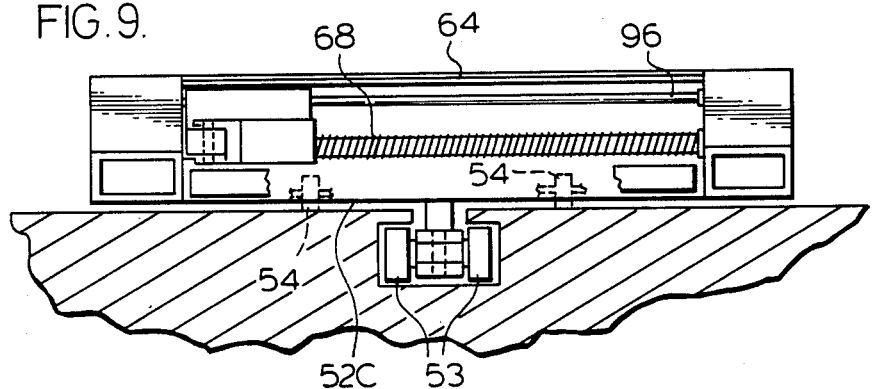
FIG. 9 is a front view partly in section of the system shown in FIGS. 1 and 8.
Figure 10:
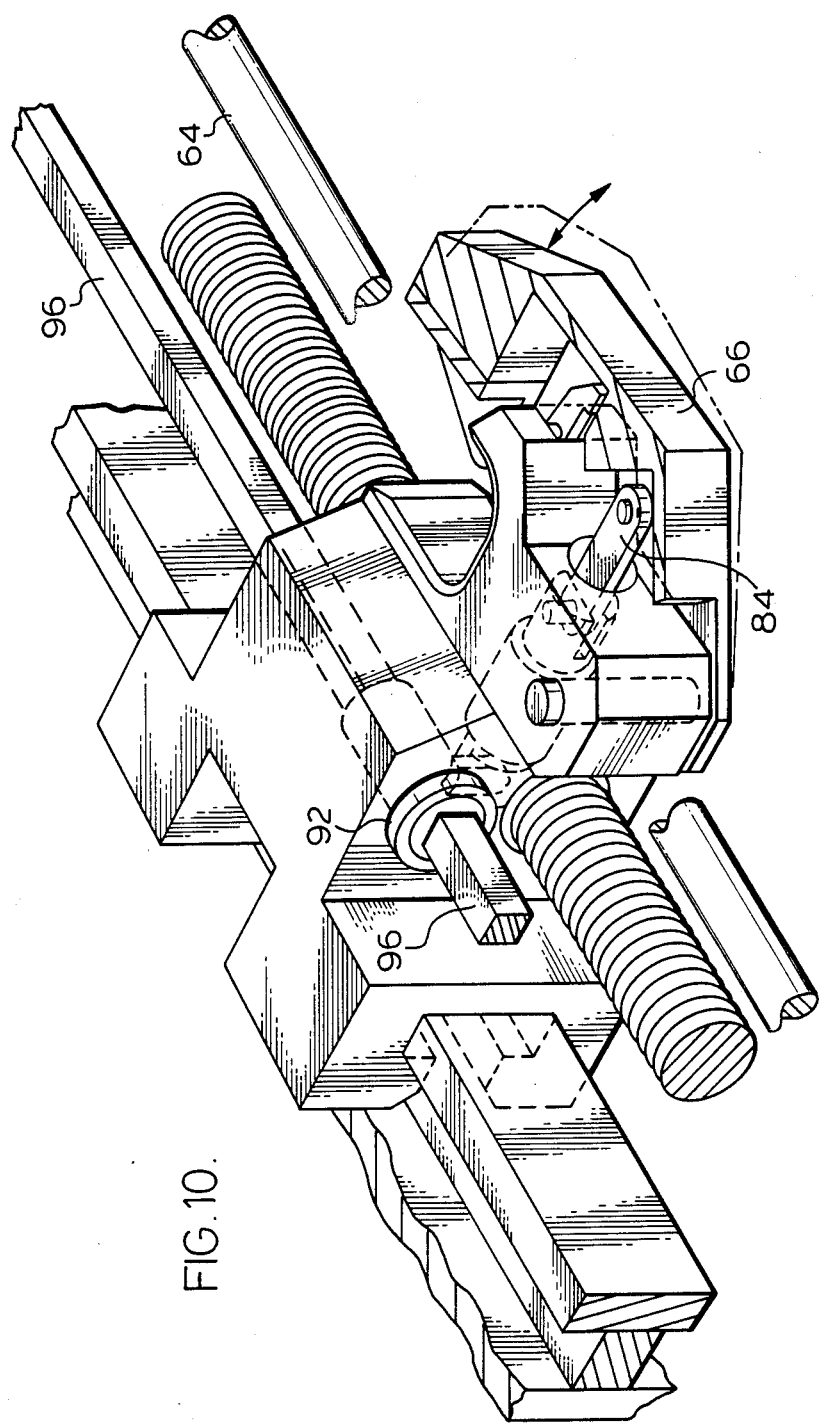
FIG. 10 is a perspective view illustrating the structure of the securing means forming part of the securing and traversing system.

With reference to FIGS. 8 and 9, securing and traversing system 48 comprises a housing 52 having forward end 52A and rear end 52B. Housing 52 carries downwardly extending casters 54, for riding on deck 36 and supporting the securing system 48 for movement on the deck and rollers 53 carried by the bottom 52C of housing 52 and pinned at 55A and 55B to chain or cable 56 passing through track 44.

Figure 11:
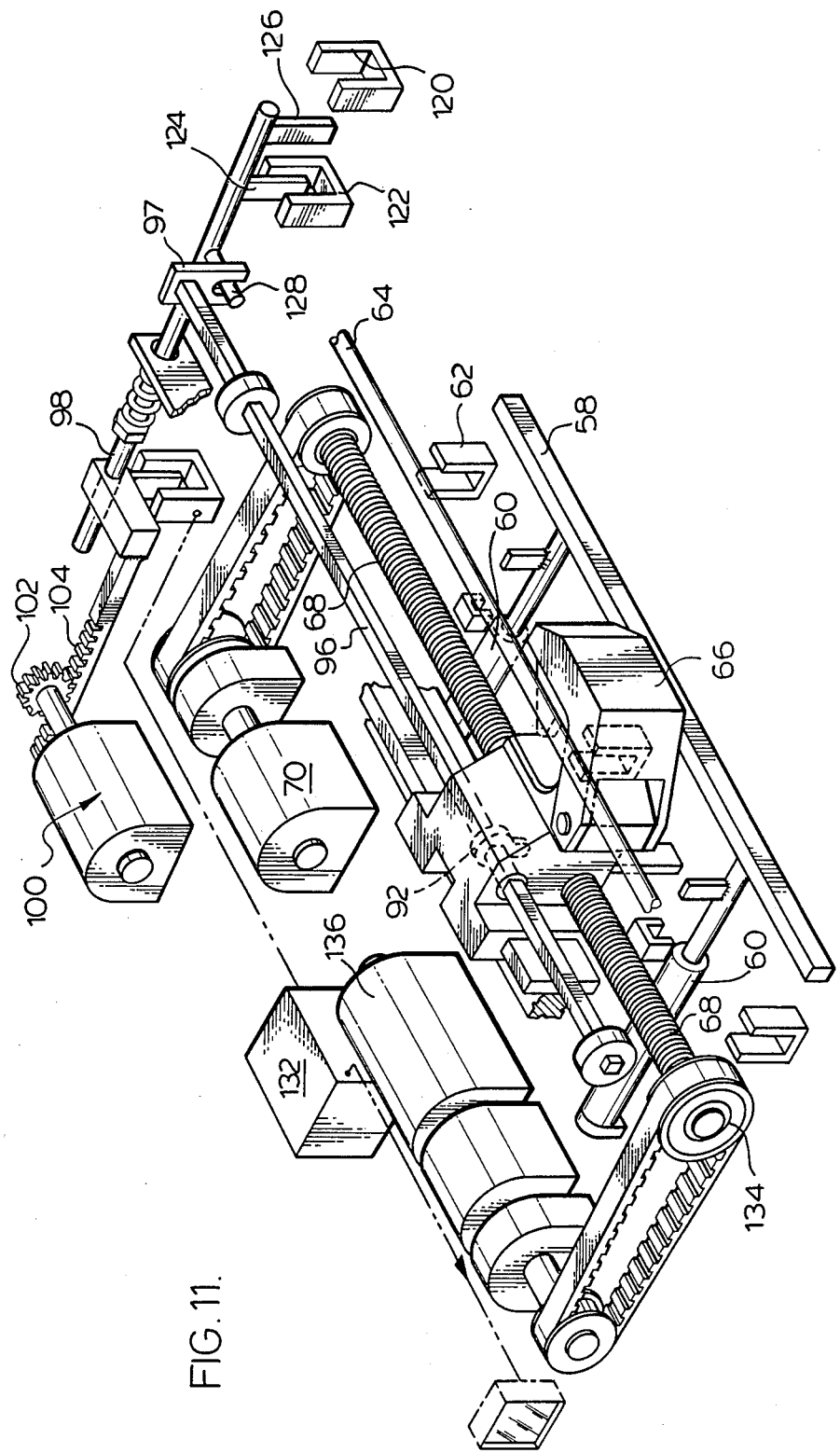
FIG. 11 is a schematic perspective view of the component parts of the rapid securing and traversing system of FIGS. 1 and 8.
Figure 15:
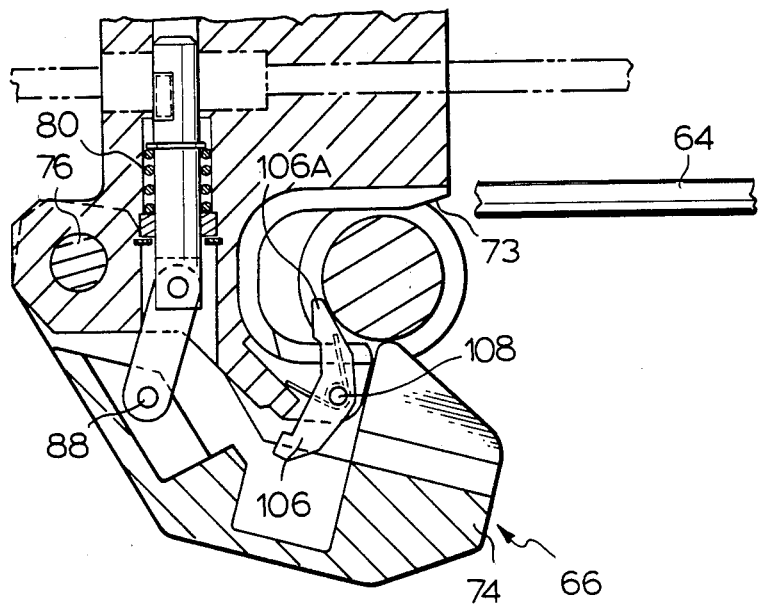
FIGS. 15 and 16 illustrate the securing of a helicopter probe by the securing means in FIG. 13, FIG. 16 illustrating the securing means in a closed position.

With reference to FIG. 11, securing and traversing system 48 comprises at the front 52A of housing 52 leading shock absorber bar 58 moveable against shock absorbing cylinder 60 as the securing and the traversing system 48 is moved towards and engages the probe 40 for absorbing the shock of the bar 58 engaging the probe. As the cylinders absorb the shock, proximity solid state switches 62 (Hans Truck GmBH & Co. Witz-/ebenstr. 7. D-4330, Mulheim/Ruhr, West Germany Model Bi 10-S30-AZ3X) are engaged by bar 58 and which slow and ultimately stop the movement of the chain 56 and thus the system 48. After the probe engages shock absorbing bar 48, it next engages sensing bar 64 (see FIG. 13) which when engaged, causes the probe to be positioned on the centre line of the mouth of securing means 66 forming part of system 48 for securing the probe 40 to the system 48. When the probe 40 is aligned on the centre line of securing means 66 (see FIG. 13) as sensed by sensing bar 64, lead screw 68 (SKF SRWA 39-25R Planetary Roller Screw) (see FIG. 11) extending across the front 52A of the housing 52, is rotated at high speed by 2 horse power high speed motor 70 (Boston Gear-BKVTF-B) moving securing means 66 along lead screw 68 capturing probe 44 (see FIGS. 13, 15 and 16). The time for capture is in the order of 1½ to 2 seconds. Where the probe (for whatever reason) moves away from the sensing bar 64, the system is activated to cause movement of system 48 to bring sensing bar 64 into contact with probe 40. Where the securing means 66 has been started along lead screw 68 prior to the probe 40 engaging sensor bar 64 (as controlled by a tracking system [not shown]), the securing means 66 moves the remaining distance along the lead screw to capture probe 40.

Figure 13:
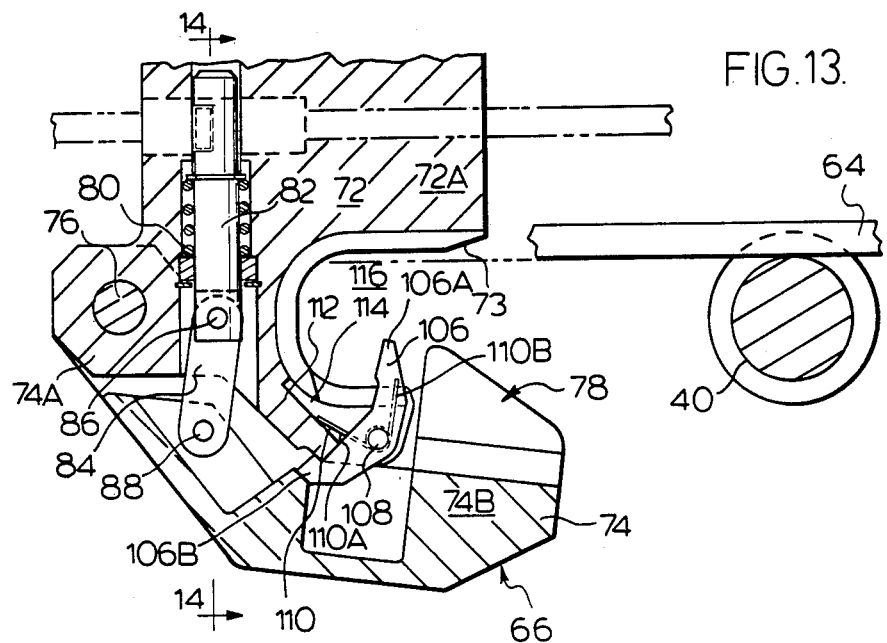
FIG. 13 illustrates the securing means in its normally partially open position of FIG. 10.
Figure 14:
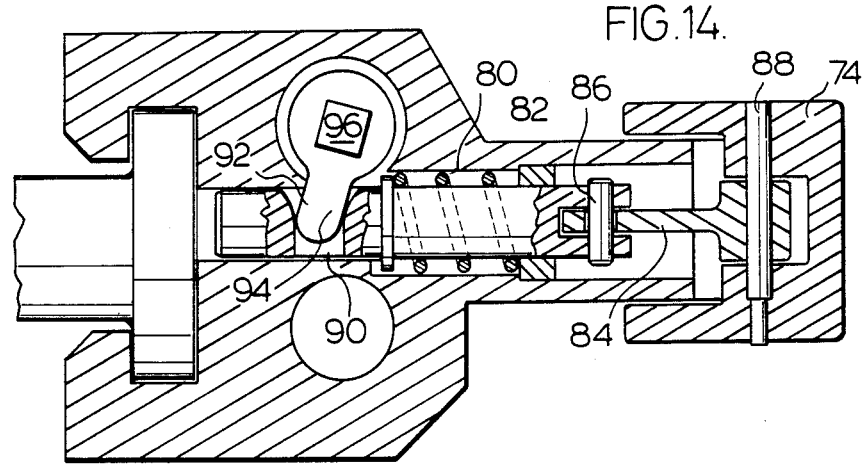
FIG. 14 is a side cross-sectional view along the line 14—14 of FIG. 13 looking in the direction of the arrows.

With reference to FIG. 13, securing means is normally partially opened prior to capturing probe 40 and comprises body 72 comprising fixed arm portion 72A and pivotally secured arm 74 pivotally secured at end 74A by pin 76 to body 72. Arm 74 carries enlarged forward end 74B and inwardly sloped wall 78, sloped towards arm portion 72A (arm 72A carries inwardly sloped wall 73) and the rear of body 72. Body 72 carries slot 80 therethrough, through which spring-loaded shaft 82 extends (see FIG. 14). Laterally extending shaft 82 is connected to arm 74 by elliptical plate 84 secured by pin 86 to shaft 82 and by pin 88 to arm 74. Shaft 82 carries slot 90 (see FIG. 14) opening upwardly and into which, follower plate tab 92 of follower plate 94 projects. Plate 94 is carried on rod 96 (square in cross-section) which extends across the front of housing 52A (see FIG. 11).

With reference to FIG. 11, rod 96 is secured to plate 97 to be engaged by actuator 98 (SKSF Linear Actuator-CARR 32×100×21E 110cB) which rotates plate 97 by motor 100 rotating pinion 102 riding in rack 104 moving rack 104 and thus actuator 98 to rotate plate 97 and thus rod 96.

Figure 16:
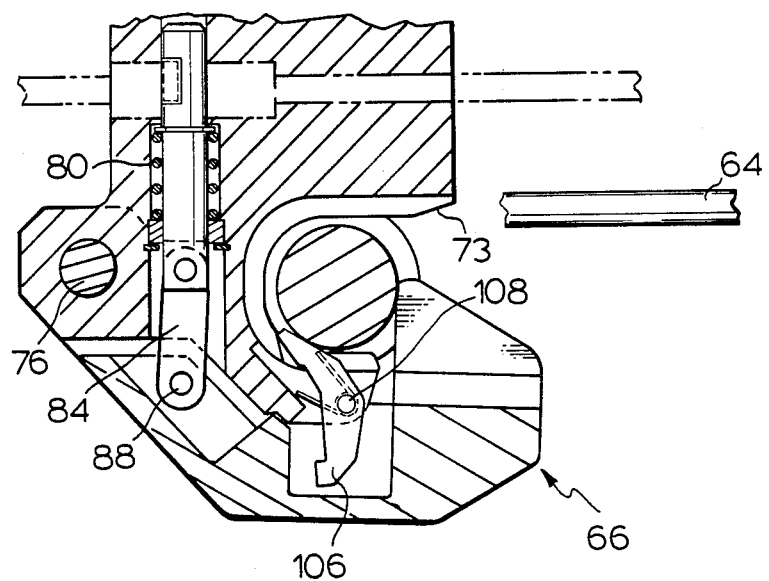

With reference to FIG. 13, securing means 66 also carries V-shaped finger or pawl 106 pivotally secured to body 72 on pin 108 about which compression spring 110 is fastened. One end 110A of pin 110 is secured to abut wall 112 in recess 114 in body 72 and the other end 110B abuts the underside of finger or pawl 106. Body 72 carries probe receiving recess 116 into which, end 106A of finger 106 normally projects. The other end 106B is normally positioned between arm 74 and body 72 thereby positioning securing means 66 in a partially open position (as seen in FIG. 13) (less than the width of probe 40). When motor 70 (see FIG. 11) is engaged driving securing means 66 along lead screw 68, probe 40 engages walls 73 and 78 which guide the probe into recess 116 as arm 74 is pivoted to open securing means 66 by the probe 40 engaging arm 74 against wall 78. As arm 74 is pivoted away from wall 73 on pin 76, finger 106 is released from between the body 72 and arm 74 and as the probe enters probe 40 (see FIG. 15), pawl 106 is pivoted on pin 108 by probe 40 engaging end 106A, compressing spring 110 until arm 74 closes behind probe 40 as shown in FIG. 16. Thus, securing means 66 closes fully on probe 40 securing the probe to the securing means. As is apparent during all of this action, plate 84, shaft 82, follower 94 and rod 96 have moved from the normally partially opened position of the securing means 66 shown in FIG. 13, to the more open position in FIG. 15 to receive probe 40 to the fully closed position in FIG. 16.

Figure 2:
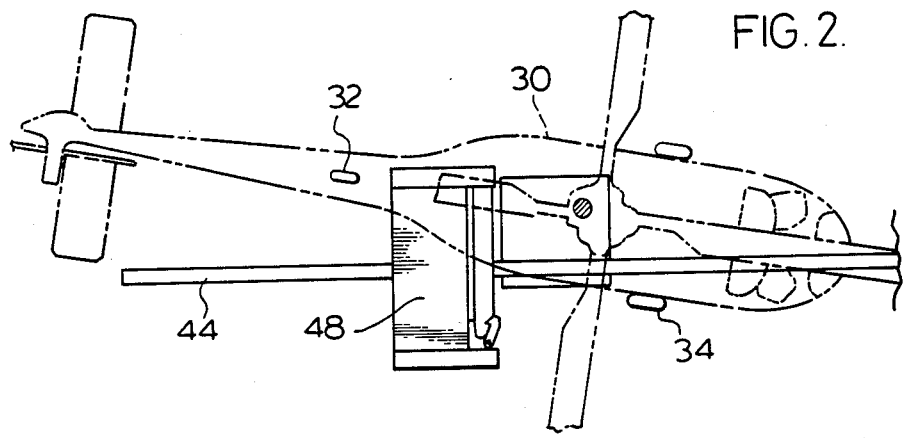
FIGS. 2 to 7 inclusive illustrate the securing of the helicopter shown in FIG. 1 and the aligning the helicopter for traversing it to for example, a hangar for storage.
Figure 3:
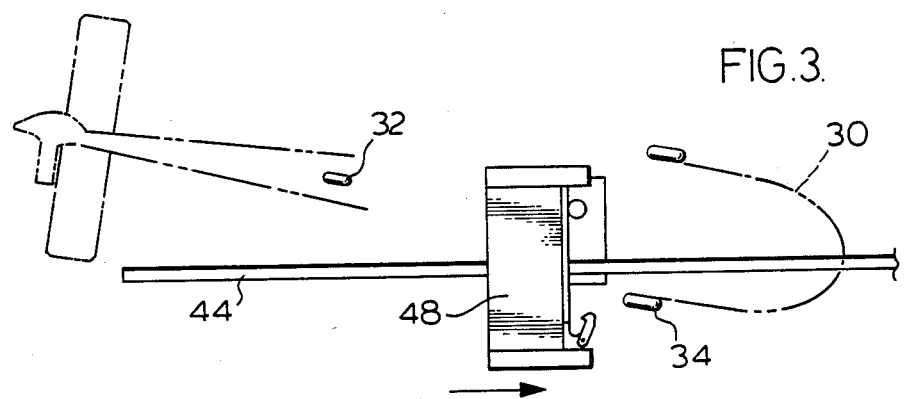
Figure 4:
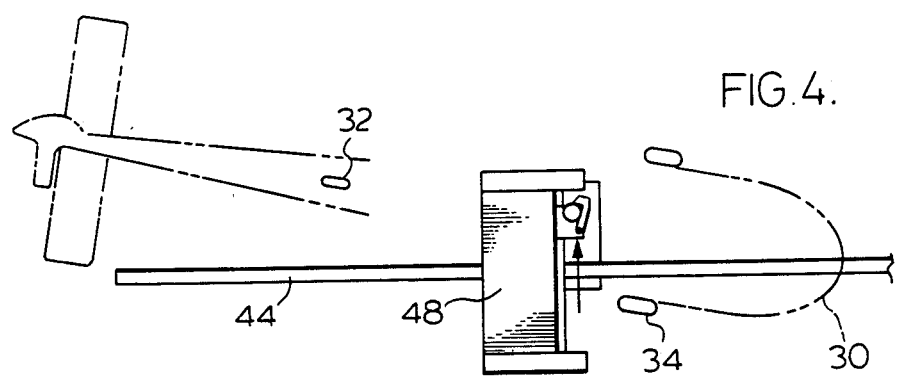
Figure 5:
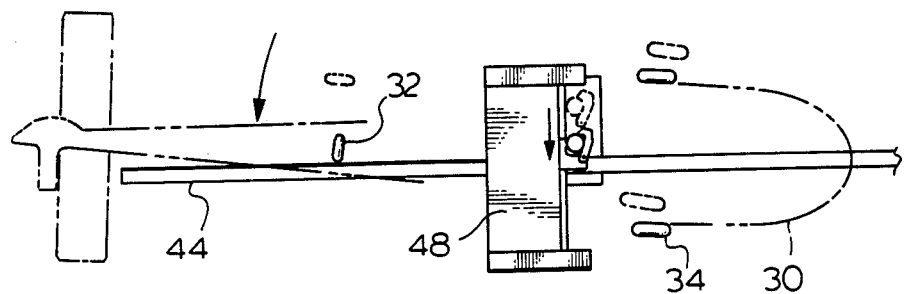
Figure 6:
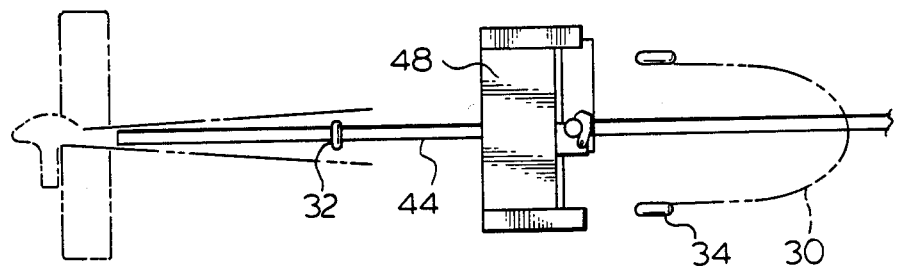
Figure 7:
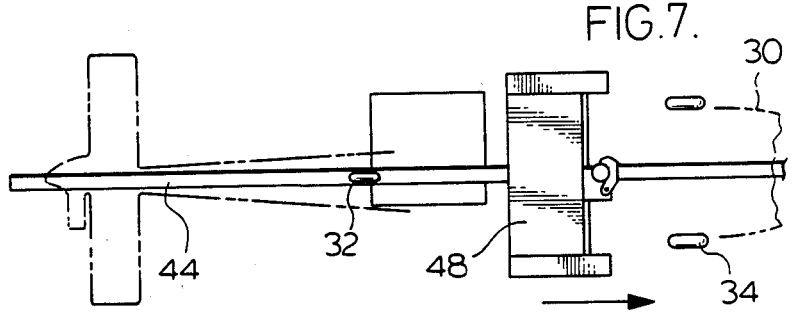
Figure 17:
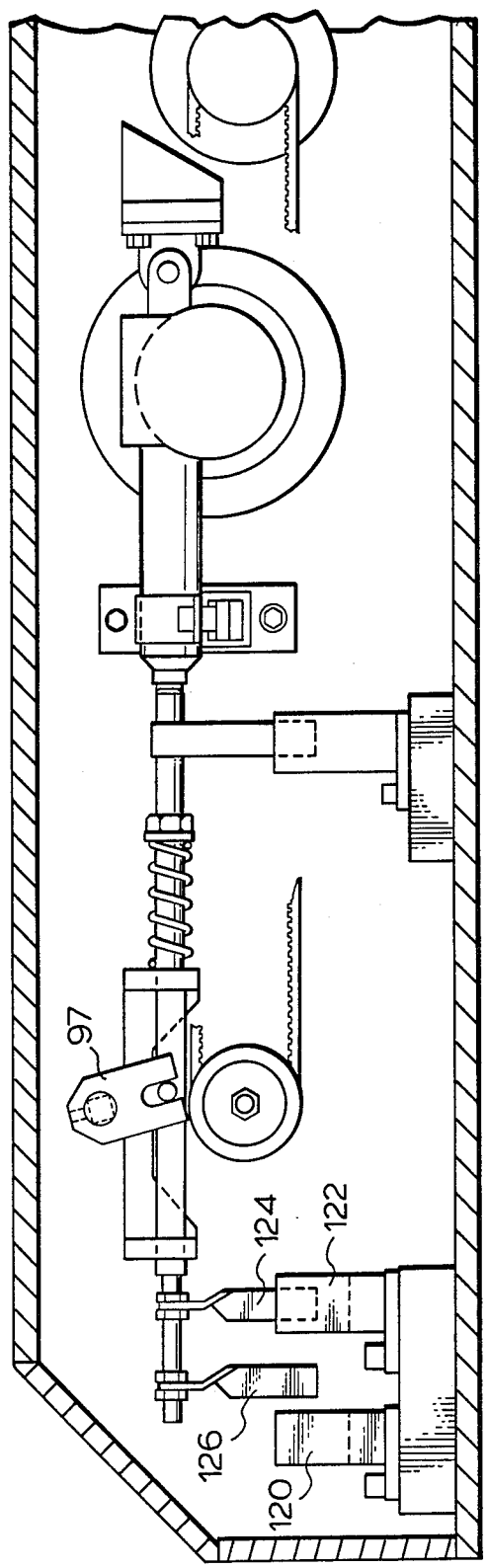
FIGS. 17 and 18 are side views of part of the structure shown in FIG. 11 illustrating their operation.

As will be seen in FIG. 11, proximity switches 120 and 122 are provided for engagement with and/or detection of one of flags 124 and 126 as rod 96 rotates plate 97. Thus, where follower 94 is rotated to the position shown in FIG. 14 (which corresponds with the position of the securing means in FIG. 16) rod 96 rotates plate 97 and thus projection 128 away from switches 122 and 120 (model Ni 10-K20-AZ3X from Hans Truck GmbH & Co. KG) positioning flag 124 in detecting position with respect to switch 122. Thus securing means 66 may be signalled closed on probe 40 (see FIG. 17). When the securing means is closed, and proximity switch 122 detects flag 124, switch 122 de-energizes motor 70 (but leaves it free-wheeling), turns on lights 130 (see FIG. 12) through machine intelligence means 132 (Sequence Logic Actuator) (see FIGS. 11 and 12) and engages clutch 134 for connecting lead screw 68 to slow speed high torque motor 136 (Parallel [helical] gear 2 horse power motor by EurodriveOR60-DT90L-BHP). When clutch 134 is engaged (with Motor 70 free-wheeling), slow speed motor 136 is connected to lead screw 68. Thus, screw 68 may be turned slowly by motor 136 for manoeuvering the helicopter once secured (see FIGS. 2 to 4 which illustrate steps for securing the helicopter) for aligning the helicopter by moving securing means 66 back and forth along lead screw 68 on the track securing, and as the traversing system 48 is appropriately positioned on the ship deck 36, to bring rear castering wheel into line with track 44 (see FIGS. 5 and 6) until the helicopter 30 is aligned for traversing (see FIG. 7).

Figure 18:
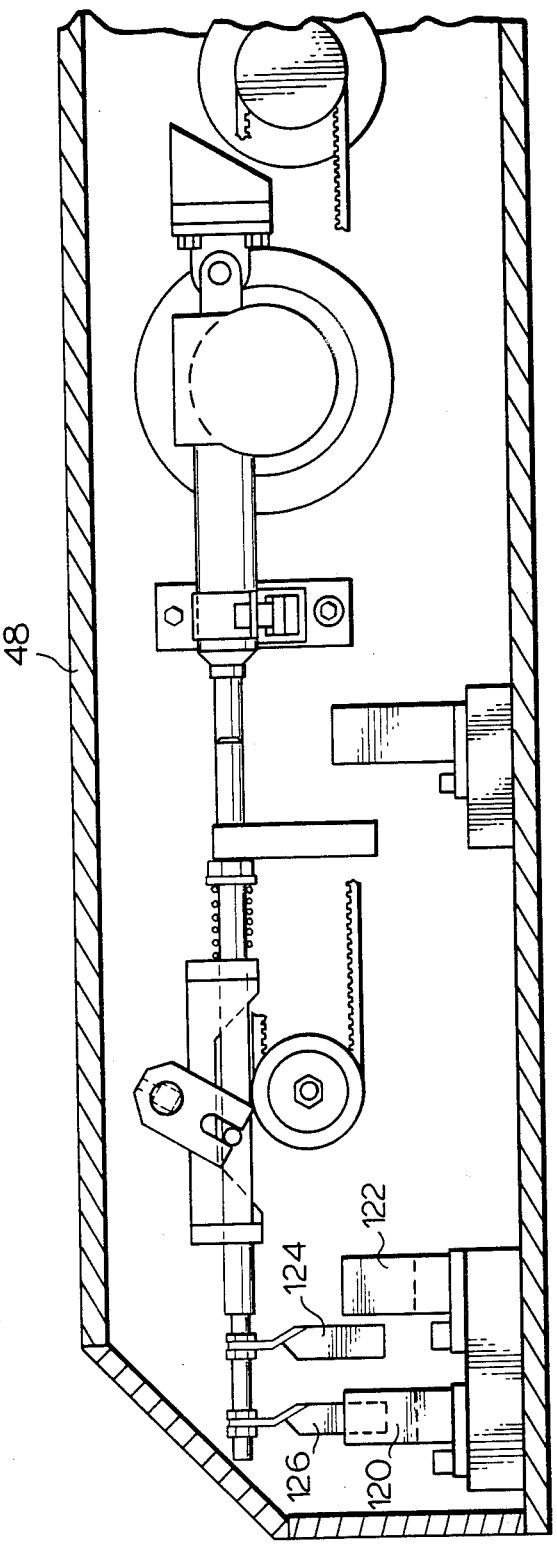

As is apparent when the helicopter 30 is to be launched, the helicopter may be removed from hangar 46 and moved to a launch position by the securing and traversing system 48 and the wheels 32, 34 of the helicopter 30 properly positioned for launch, the securing means 66 must be opened to release the probe 40. In this regard, activator 98 is caused to rotate plate 97, rod 96 and follower 92 causing shaft 82 to push plate 84 pushing arm 74 away from body 72 opening securing means 66 wider than probe 70. In that event, flags 124 and 126 are moved towards proximity switch 120 so that flag 126 is detected by proximity switch 120 (see FIG. 18). In this event, the lights 130 are turned off, the clutch 134 is disengaged and motor 70 is once again activated to cause securing means 66 to be retracted quickly from probe 40 by lead screw 68 for launch purposes. Indicator means (for example, lights) can be provided to indicate the securing means 66 has been retracted from probe 40.

Figure 12:
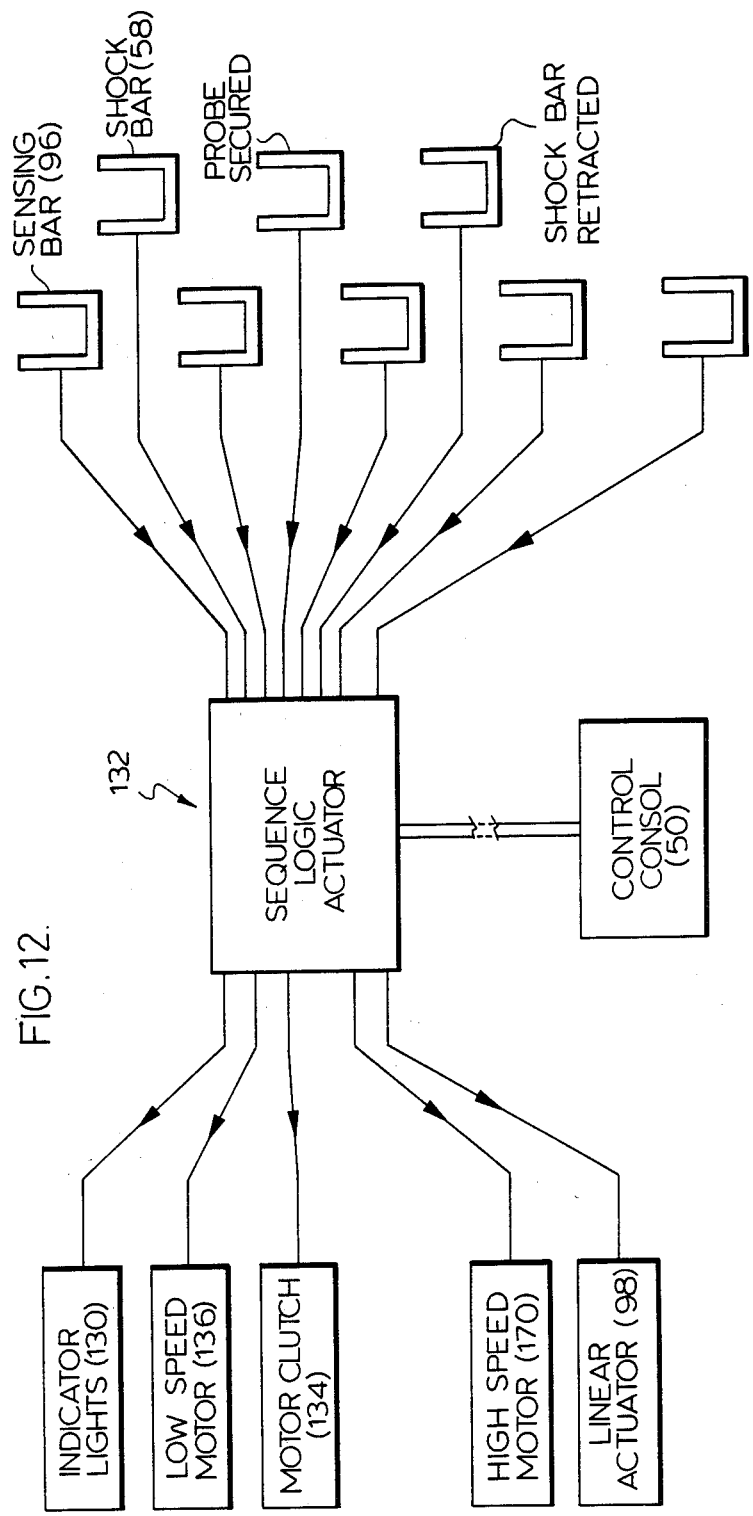
FIG. 12 illustrates the use of machine intelligence means to operate the system of FIG. 11.

With reference to FIG. 12, machine intelligence means 134 (Sequence Logic Actuator) is secured to the control console 50 (see FIG. 1) and is connected to the various components in the system 48 (see FIG. 12) to detect their relative positions, and their actuation.

Where the securing means 66 is opened and the probe 40 withdrawn, finger (pawl) 106 is returned to its original position by the action of compressed spring 110. Thereafter, when arm 74 is closed towards body 72, end 106B of finger 106 is positioned between body 72 and arm 74 and securing means 66 is returned to its initial partially open position which can be indicated by flags 124 and 126 not being in proximity with proximity switches 120 and 122, through the machine intelligence means 132. However, high speed motor 70 is once again activated ready to operate lead screw 68 at high speed.

Figure 19:
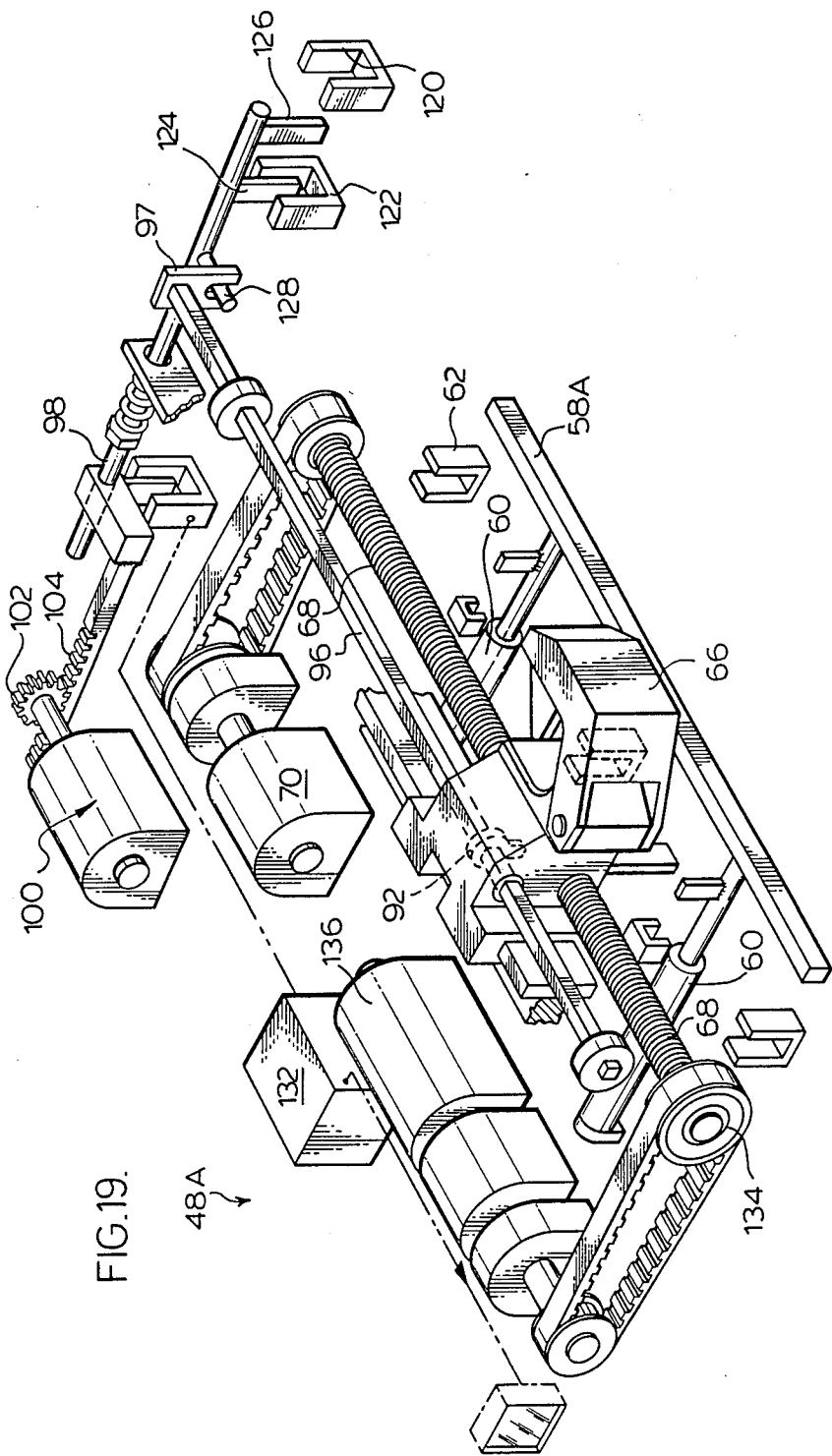
FIG. 19 is a schematic perspective view of the component parts of another rapid securing and traversing system constructed according to another embodiment of the invention.

With reference to FIG. 19, securing and traversing system 48A is shown constructed substantially the same as securing and traversing system 48 shown in FIG. 11 except that shock bar 58 and sensor bar 64 have been combined into bar 58A which combines the abilities of both bars 58 and 64.

As many changes can be made to the preferred embodiment of the invention without departing from the scope of the invention, it is intended that all matter contained herein be illustrative of the invention and not in a limiting sense.

The embodiments of the invention in which an exclusive property or privilege is claimed are as follows:

1. A helicopter rapid securing and traversing system for securing a helicopter upon landing on the deck of a ship for subsequently traversing it from its landing position, said system comprising a housing reciprocal from a position remote the landing area to a position adjacent the landing area of the helicopter, the housing carrying a shock absorber and sensing means extending across the housing for contacting a probe or other projection extending from the helicopter on the exterior of the helicopter when the helicopter has landed on the deck of the ship and the housing is brought to engage the probe or other projection, the shock absorber and sensing means for slowing and stopping the movement of the housing when the probe or projection is engaged and for cushioning the engagement and for sensing the position of the probe or projection, means for reciprocating the housing towards and away from the landing area, a carrier on the housing extending across the housing and carrying securing means thereon for securing the housing to the probe or projection on the helicopter, the securing means being normally secured at one side of the housing on the carrier and being moved laterally along the carrier across the housing when the carrier is activated to capture the probe or projection, the securing means carrying a laterally opening mouth opening in the direction towards the probe, and means to operate the carrier whereby when the probe or projection engages the shock absorber and sensing means, the impact of the probe is cushioned and the position of the probe or projection is sensed relative to the mouth of the securing means whereby when the probe is sensed as positioned in line with the mouth of the securing means, the carrier moves the securing means to grasp and secure the probe or projection and when the probe is sensed not to be appropriately positioned, the system is activated to cause the helicopter rapid securing system to be appropriately positioned relative to the probe.

2. The system of claim 1, wherein the shock absorber and sensing means are incorporated in one structure to stop the probe in a position along the centre line of the mouth when the housing is slowed up and stopped and permitting the carrier to move the securing means laterally across the housing to capture the probe.

3. The system of claim 1, wherein the shock absorber and sensing means are different structures.

4. A helicopter rapid securing and traversing system for securing a helicopter upon landing on the deck of a ship and for subsequently traversing it from its landing position, said system comprising a housing reciprocal from a position remote the landing area to a position adjacent the landing area of the helicopter, the housing carrying a shock absorbing bar extending across the housing from one side to the other normal to the direction of movement of the housing for contacting a probe or other projection extending from the helicopter on the exterior of the helicopter when the helicopter has landed on the deck of the ship and the housing is brought to the probe or other projection, the shock absorbing bar being depressed towards the housing opposite the direction of movement of the housing upon engaging the probe or projection to slow and stop the movement of the housing and cushion the impact of the probe or other projection, means for reciprocating the housing towards and away from the landing area, a carrier on the housing extending parallel to the shock absorbing bar, the carrier for securing securing means thereto for securing the housing to the probe or other projection on the helicopter, the securing means being normally secured at one side of the housing on the carrier and being moved when the carrier is activated, laterally across the housing to capture the probe or projection, the securing means carrying a laterally opening mouth opening in the direction across the housing towards the probe and the other side of the housing, sensing means for sensing the position of the probe relative to the mouth of the securing means for sensing when the mouth is appropriately aligned with the probe so that when the securing means is moved by the carrier, the securing means will grasp and secure the probe and for sensing when the probe has moved away from the sensing means whereupon the system is activated to appropriately position the helicopter rapid securing system and thus the securing means relative to the probe or other projection and, means to operate the carrier.

5. The helicopter rapid securing and traversing system of claim 4, wherein the shock absorber and sensing means are incorporated in one structure to stop the system in a position wherein the probe is along the centre line of the mouth when the housing is slowed up and stopped and permitting the carrier to move the securing means laterally across the housing to capture the probe.

6. The helicopter rapid securing and traversing system of claim 4, wherein when the shock absorbing bar is depressed towards the housing, the shock absorbing bar engages a switch turning off the power to the means for reciprocating the housing.

7. The helicopter rapid securing and traversing system of claim 5, wherein when the sensing means and shock absorbing bar is depressed towards the housing, it engages a switch turning off the power to the means for reciprocating the housing.

8. The helicopter rapid securing and traversing system of claim 1, wherein the carrier is a lead screw extending across the housing.

9. The helicopter rapid securing and traversing system of claim 2, wherein the carrier is a lead screw extending across the housing.

10. The helicopter rapid securing and traversing system of claim 3, wherein the carrier is a lead screw extending across the housing.

11. The helicopter rapid securing and traversing system of claim 4, wherein the carrier is a lead screw extending across the housing.

12. The helicopter rapid securing and traversing system of claim 5, wherein the carrier is a lead screw extending across the housing.

13. The helicopter rapid securing and traversing system of claim 1, wherein the carrier is a hydraulically driven or electrically driven chain drive.

14. The helicopter rapid securing and traversing system of claim 2, wherein the carrier is a hydraulically driven or electrically driven chain drive.

15. The helicopter rapid securing and traversing system of claim 3, wherein the carrier is a hydraulically driven or electrically driven chain drive.

16. The helicopter rapid securing and traversing system of claim 4, wherein the carrier is a hydraulically driven or electrically driven chain drive.

17. The helicopter rapid securing and traversing system of claim 5, wherein the carrier is a hydraulically driven or electrically driven chain drive.

18. The helicopter rapid securing and traversing system of claim 4, wherein the sensing means is a sensing bar which extends parallel to the carrier and shock absorbing bar and is positioned closer the housing than the shock absorbing bar and being positioned along the centre line of the laterally opening mouth of the securing means to stop the probe in a position along the centre line of the mouth when the housing is slowed up and stopped when the shock absorber engages the probe or other projection and permitting the carrier to move the securing means laterally across the housing to capture the probe.

19. The helicopter rapid securing and traversing system of claim 5, wherein the sensing means and shock absorber bar is a bar which extends parallel to the carrier to stop the probe in a position along the centre line of the mouth when the housing is slowed up and stopped when it engages the probe or other projection permitting the carrier to move the securing means laterally across the housing to capture the probe.

20. The helicopter rapid securing and traversing system of claim 6, wherein the sensing means is a sensing bar which extends parallel to the carrier and shock absorbing bar and is positioned closer the housing than the shock absorbing bar and is positioned along the centre line of the laterally opening mouth of the securing means to stop the probe in a position along the centre line of the mouth when the housing is slowed up and stopped when the shock absorber engages the probe or other projection and permitting the carrier to move the securing means laterally across the housing to capture the probe.

21. The helicopter rapid securing and traversing system of claim 7, wherein the sensing means and shock absorbing bar is a bar which extends parallel to the carrier to stop the system in a position wherein the probe is along the centre line of the mouth when the housing is slowed up and stopped when it engages the probe or other projection and permitting the carrier to move the securing means laterally across the housing to capture the probe.

22. The helicopter rapid securing and traversing system of claim 18, wherein the means to stop the system in a position wherein the probe is along the centre line of the mouth comprises the sensing bar being depressed and causing a switch to be engaged, stopping the movement of the housing.

23. The helicopter rapid securing and traversing system of claim 19, wherein the means to stop the system in a position wherein the probe is along the centre line of the mouth comprises the bar being depressed and causing a switch to be engaged stopping the movement of the housing.

24. The helicopter rapid securing and traversing system of claim 20, wherein the means to stop the system in a position wherein the probe is along the centre line of the mouth comprises the sensing bar being depressed and causing a switch to be engaged, stopping the movement of the housing.

25. The helicopter rapid securing and traversing system of claim 21, wherein the means to stop the system in a position wherein the probe is along the centre line of the mouth comprises the bar being depressed and causing a switch to be engaged stopping the movement of the housing.

26. The helicopter rapid securing and traversing system of claim 1, wherein where the carrier for the securing means comprises a lead screw, the means to operate the lead screw comprises a high speed electric motor for turning the lead screw to move the securing means therealong by reciprocal means on the securing means engaging the lead screw and a slow speed high torque electric motor for turning the lead screw once the probe is grasped and captured by the securing means, means to deactivate (de-energize) the high speed motor when the probe is grasped by the securing means but not lock the motor permitting it to free wheel, a clutch for connecting the slow speed high torque electric motor to the lead screw when the high speed motor is de-energized.

27. The helicopter rapid securing and traversing system of claim 2, wherein the carrier for the securing means comprises a lead screw, the means to operate the lead screw comprises a high speed electric motor for turning the lead screw to move the securing means therealong by reciprocal means on the securing means engaging the lead screw and a slow speed high torque electric motor for turning the lead screw once the probe is grasped and captured by the securing means, means to deactivate (de-energize) the high speed motor when the probe is grasped by the securing means but not lock the motor permitting it to free wheel, a clutch for connecting the slow speed high torque electric motor to the lead screw when the high speed motor is de-energized.

28. The helicopter rapid securing and traversing system of claim 3, wherein where the carrier for the securing means comprises a lead screw, and the means to operate the lead screw comprises a high speed electric motor for turning the lead screw to move the securing means therealong by reciprocal means on the securing means engaging the lead screw and a slow speed high torque electric motor for turning the lead screw once the probe is grasped and captured by the securing means, means to deactivate (de-energize) the high speed motor when the probe is grasped by the securing means but not lock the motor permitting it to free wheel, a clutch for connecting the slow speed high torque electric motor to the lead screw when the high speed motor is de-energized.

29. The helicopter rapid securing and traversing system of claim 4, wherein where the carrier for the securing means comprises a lead screw, and the means to operate the lead screw comprises a high speed electric motor for turning the lead screw to move the securing means therealong by reciprocal means on the securing means engaging the lead screw and a slow speed high torque electric motor for turning the lead screw once the probe is grasped and captured by the securing means, means to deactivate (de-energize) the high speed motor when the probe is grasped by the securing means but not lock the motor permitting it to free wheel, a clutch for connecting the slow speed high torque electric motor to the lead screw when the high speed motor is de-energized.

30. The helicopter rapid securing and traversing system of claim 5, wherein the carrier is a lead screw and the means to operate the lead screw comprises a high speed electric motor for turning the lead screw to move the securing means therealong by reciprocal means on the securing means engaging the lead screw and a slow speed high torque electric motor for turning the lead screw once the probe is grasped and captured by the securing means, means to de-energize (deactivate) the high speed motor when the probe is grasped by the securing means but not lock the motor permitting it to free wheel, a clutch for connecting the slow speed high torque electric motor to the lead screw when the high speed motor is de-energized.

31. The helicopter rapid securing and traversing system of claim 6, wherein the carrier is a lead screw and the means to operate the lead screw comprises a high speed electric motor for turning the lead screw to move the securing means therealong by reciprocal means on the securing means engaging the lead screw and a slow speed high torque electric motor for turning the lead screw once the probe is grasped and captured by the securing means, means to de-energize (deactivate) the high speed motor when the probe is grasped by the securing means but not lock the motor permitting it to free wheel, a clutch for connecting the slow speed high torque electric motor to the lead screw when the high speed motor is de-energized.

32. The helicopter rapid securing and traversing system of claim 7, wherein the carrier is a lead screw and the means to operate the lead screw comprises a high speed electric motor for turning the lead screw to move the securing means therealong by reciprocal means on the securing means engaging the lead screw and a slow speed high torque electric motor for turning the lead screw once the probe is grasped and captured by the securing means, means to de-energize (deactivate) the high speed motor when the probe is grasped by the securing means but not lock the motor permitting it to free wheel, a clutch for connecting the slow speed high torque electric motor to the lead screw when the high speed motor is de-energized.

33. The helicopter rapid securing and traversing system of claim 8, wherein the carrier is a lead screw and the means to operate the lead screw comprises a high speed electric motor for turning the lead screw to move the securing means therealong by reciprocal means on the securing means engaging the lead screw and a slow speed high torque electric motor for turning the lead screw once the probe is grasped and captured by the securing means, means to de-energize (deactivate) the high speed motor when the probe is grasped by the securing means but not lock the motor permitting it to free wheel, a clutch for connecting the slow speed high torque electric motor to the lead screw when the high speed motor is de-energized.

34. The helicopter rapid securing and traversing system of claim 9, wherein the means to operate the lead screw comprises a high speed electric motor for turning the lead screw to move the securing means therealong by reciprocal means on the securing means engaging the lead screw and a slow speed high torque electric motor for turning the lead screw once the probe is grasped and captured by the securing means, means to de-energize (deactivate) the high speed motor when the probe is grasped by the securing means but not lock the motor permitting it to free wheel, a clutch for connecting the slow speed high torque electric motor to the lead screw when the high speed motor is de-energized.

35. The helicopter rapid securing and traversing system of claim 10, wherein the carrier is a lead screw and the means to operate the lead screw comprises a high speed electric motor for turning the lead screw to move the securing means therealong by reciprocal means on the securing means engaging the lead screw and a slow speed high torque electric motor for turning the lead screw once the probe is grasped and captured by the securing means, means to de-energize (deactivate) the high speed motor when the probe is grasped by the securing means but not lock the motor permitting it to free wheel, a clutch for connecting the slow speed high torque electric motor to the lead screw when the high speed motor is de-energized 36. The helicopter rapid securing and traversing system of claim 11, wherein the carrier is a lead screw and the means to operate the lead screw comprises a high speed electric motor for turning the lead screw to move the securing means therealong by reciprocal means on the securing means engaging the lead screw and a slow speed high torque electric motor for turning the lead screw once the probe is grasped and captured by the securing means, means to de-energize (deactivate) the high speed motor when the probe is grasped by the securing means but not lock the motor permitting it to free wheel, a clutch for connecting the slow speed high torque electric motor to the lead screw when the high speed motor is de-energized.

37. In a helicopter rapid securing and traversing system, securing means carried by a carrier and moveable by the carrier to grasp and capture a probe or other projection of a helicopter landing on the deck of a ship, the securing means being normally partially open when it does not grasp the probe or other projection and being moveable from the normally partially opened position to a closed position when it grasps the probe and being moveable to an opened position presenting a greater opening than the opening when the securing means is normally partially open whereat it is able to release the probe, the securing means comprising a body carrying a probe or other projection-receiving recess and a pair of arms extending laterally across the traverser on either side of the recess, at least one arm moveable towards the other arm, the at least one moveable arm being urged to a closed position to preclude the probe or other projection from leaving the recess when the securing means is closed, means secured to the body, at least one portion normally extending into the probe or other projection-receiving recess whereat the securing means is in its normally partially opened position and whereby the mouth opening between the at least one moveable arm and other arm is less than the width of the probe or other projection and when the probe or other projection is in the probe or other projection-receiving recess, the means has been moved out of its position whereby the at least one pivotable arm and thus the securing means is closed presenting no mouth opening or a mouth opening less than the width of the probe or other projection, and whereby when the moveable arm is pivoted to a position whereby the space between the body and moveable arm forming the mouth of the securing means is greater than the width of the probe or other projection for releasing the probe or other projection and whereby when the probe or other projection is released from the probe-receiving recess, said means is restored to position with a portion thereof extending into the probe or other projection-receiving recess.

38. The helicopter rapid securing and traversing system of claim 1, wherein the securing means carried by the carrier and moveable by the carrier to grasp and capture the probe or other projection of the helicopter is normally partially open when it does not grasp the probe or other projection and is moveable from the normally partially opened position to a closed position when it grasps the probe and is moveable to an open position whereat it is able to release the probe.

39. The helicopter rapid securing and traversing system of claim 2, wherein the securing means carried by the carrier and moveable by the carrier to grasp and capture the probe or other projection of the helicopter is normally partially open when it does not grasp the probe or other projection and is moveable from the normally partially opened position to a closed position when it grasps the probe and is moveable to an open position whereat it is able to release the probe.

40. The helicopter rapid securing and traversing system of claim 3, wherein the securing means carried by the carrier and moveable by the carrier to grasp and capture the probe or other projection of the helicopter is normally partially open when it does not grasp the probe or other projection and is moveable from the normally partially opened position to a closed position when it grasps the probe and is moveable to an open position whereat it is able to release the probe.

41. The helicopter rapid securing and traversing system of claim 4, wherein the securing means carried by the carrier and moveable by the carrier to grasp and capture the probe or other projection of the helicopter is normally partially open when it does not grasp the probe or other projection and is moveable from the normally partially opened position to a closed position when it grasps the probe and is moveable to an open position whereat it is able to release the probe.

42. The helicopter rapid securing and traversing system fo claim 5, wherein the securing means carried by the carrier and moveable by the carrier to grasp and capture the probe or other projection of the helicopter is normally partially open when it does not grasps the probe or other projection and is moveable from the normally partially opened position to a closed position when it grasps the probe and is moveable to an open position whereat it is able to release the probe.

43. The helicopter rapid securing and traversing system of claim 6, wherein the securing means carried by the carrier and moveable by the carrier to grasp and capture the probe or other projection of the helicopter is normally partially open when it does not grasp the probe or other projection and is moveable from the normally partially opened position to a closed position when it grasps the probe and is moveable to an open position whereat it is able to release the probe.

44. The helicopter rapid securing and traversing system of claim 7, wherein the securing means carried by the carrier and moveable by the carrier to grasp and capture the probe or other projection of the helicopter is normally partially open when it does not grasp the probe or other projection and is moveable from the normally partially opened position to a closed position when it grasps the probe and is moveable to an open position whereat it is able to release the probe.

45. The helicopter rapid securing and traversing system of claim 8, wherein the securing means carried by the carrier and moveable by the carrier to grasp and capture the probe or other projection of the helicopter is normally partially open when it does not grasp the probe or other projection and is moveable from the normally partially opened position to a closed position when it grasps the probe and is moveable to an open position whereat it is able to release the probe.

46. The helicopter rapid securing and traversing system of claim 9, wherein the securing means carried by the carrier and moveable by the carrier to grasp and capture the probe or other projection of the helicopter is normally partially open when it does not grasp the probe or other projection and is moveable from the normally partially opened position to a closed position when it grasps the probe and is moveable to an open position whereat it is able to release the probe.

47. The helicopter rapid securing and traversing system of claim 10, wherein the securing means carried by the carrier and moveable by the carrier to grasp and capture the probe or other projection of the helicopter is normally partially open when it does not grasp the probe or other projection and is moveable from the normally partially opened position to a closed position when it grasps the probe and is moveable to an open position whereat it is able to release the probe.

48. The helicopter rapid securing and traversing system of claim 11, wherein the securing means carried by the carrier and moveable by the carrier to grasp and capture the probe or other projection of the helicopter is normally partially open when it does not grasp the probe or other projection and is moveable from the normally partially opened position to a closed position when it grasps the probe and is moveable to an open position whereat it is able to release the probe.

49. The securing means of claim 36, wherein when the securing means is fully closed, the operation of the carrier at high speed is precluded and an indicator indicates the securing means is closed.

50. The securing means of claim 36, wherein when the carrier on which the securing means is carried is a lead screw, the lead screw is connected to an electrical high speed motor which motor is disengaged from electrical operation until the securing means is either in its open position or normally partially opened position.

51. The securing means of claim 48, wherein when the carrier on which the securing means is carried is a lead screw, the lead screw is connected to an electrical high speed motor which motor is disengaged from electrical operation until the securing means is either in its open position or normally partially opened position.

52. The securing means of claim 49, wherein when the securing means is fully closed, a low speed high torque motor is operationally engaged with the lead screw for use to manoeuver and manipulate the securing means and probe or other projection and thus the helicopter for traversing of the helicopter.

53. The securing means of claim 50, wherein when the securing means is fully closed, a low speed high torque motor is operationally engaged with the lead screw for use to manoeuver and manipulate the securing means and probe or other projection and thus the helicopter for traversing of the helicopter.

54. The securing means of claim 36, wherein the securing means comprises a body carrying a probe or other projection-receiving recess and a pair of arms extending laterally across the traverser on either side of the recess, at least one arm moveable towards the other arm, the at least one moveable arm being urged to a closed position to preclude the probe or other projection from leaving the recess when the securing means is closed, a finger or pawl secured to the body, at least one portion normally being positioed to extend between at least one arm and the body and at least another portion extending into the probe or other projection-receivin recess whereat the securing means is in its normally partially opened position and whereby the mouth opening between the at least one moveable arm and the other arm is less than the width of the probe or other projection and when the probe or other projection is in the probe or other projection-receivi recess, the finger or pawl is moveable against the action of a spring out of its position spacing the body and the at least one moveable arm whereby the at least one pivotable arm and thus the securing means is closed presenting no mouth opening or a mouth opening less than the width of the probe or other projection, and whereby when the moveable arm is pivoted to a position whereby the space between the body and moveable arm forming the mouth of the securing means is greater than the width of the probe or other projection for releasing the probe or other projection and whereby when the probe or other projection is released from the probe-receiving recess, the finger or pawl is restored to position with a portion thereof between the body and moveable arm so that when the probe or other projection is fully released and the arm moves towards the body and towards the other arm, the finger or pawl blocks engagement and further movement, thus returning the securing means to its normally partially opened position.

55. The securing means of claim 48, wherein the securing means comprises a body carrying a probe or other projection-receiving recess and a pair of arms extending laterally across the traverser on either side of the recess, at least one arm moveable towards the other arm, the at least one moveable arm being urged to a closed positon to preclude the probe or other projection from leaving the recess when the securing means is closed, a finger or pawl secured to the body, at least one portion normally being positioned to extend between the at least one arm and the body and at least another portion extending into the probe or other projection-receivin recess whereat the securing means is in its normally partially opened position and whereby the mouth opening between the at least one moveable arm and other arm is less than the width of the probe or other projection and when the probe or other projection is in the probe or other projection-receiving recess, the finger or pawl is moveable against the action of a spring out of its position spacing the body and the at least one moveable arm whereby the at least one pivotable arm and thus the securing means is closed presenting no mouth opening or a mouth opening less than the width of the probe or other projection, and whereby when the moveable arm is pivoted to a positon whereby the space between the body and moveable arm forming the mouth of the securing means is greater than the width of the probe or other projection for releasing the probe or other projection and whereby when the probe or other projection is released from the probe-receiving recess, the finger or pawl is restored to position with a portion thereof between the body and moveable arm so that when the probe or other projection is fully released and the arm moves towards the body and towards the other arm, the finger or pawl blocks engagement and further movement, thus returning the securing means to its normally partially opened position.

56. The securing means of claim 49, wherein the securing means comprises a body carrying a probe or other projection-receiving recess and a pair of arms extending laterally across the traverser on either side of the recess, at least one arm moveable towards the other arm, the at least one moveable arm being urged to a closed position to preclude the probe or other projection from leaving the recess when the securing means is closed, a finger or pawl secured to the body, at least one portion normally being positioned to extend between the at least one arm and the body and at least another portion extending into the probe or other projection-receivin recess whereat the securing means is in its normally partially opened position and whereby the mouth opening between the at least one moveable arm and other arm is less than the width of the probe or other projection and when the probe or other projection is in the probe or other projection-receiving recess, the finger or pawl is moveable against the action of a spring out of its position spacing the body and the at least one moveable arm whereby the at least one pivotable arm and thus the securing means is closed presenting no mouth opening or a mouth opening less than the width of the probe or other projection, and whereby when the moveable arm is pivoted to a position whereby the spaced between the body and moveable arm forming the mouth of the securing means is greater than the width of the probe or other projection for releasing the probe or other projection and whereby when the probe or other projection is released from the probe-receiving recess, the finger or pawl is restored to position with a portion thereof between the body and moveable arm so that when the probe or other projection is fully released and the arm moves towards the body and towards the other arm, the finger or pawl blocks engagement and further movement, thus returning the securing means to its normally partially opened position.

57. The securing means of claim 50, wherein the securing means comprises a body carrying a probe or other projection-receiving recess and a pair of arms extending laterally across the traverser on either side of the recess, at least one arm moveable towards the other arm, the at least one moveable arm being urged to a closed position to preclude the probe or other projection from leaving the recess when the securing means is closed, a finger or pawl secured to the body, at least one portion normally being positioned to extend between the at least one arm and the body and at least another portion extending into the probe or other projection-receiving recess whereat the securing means is in its normally partially opened position and whereby the mouth opening between the at least one moveable arm and other arm, is less than the width of the probe or other projection and when the probe or other projection is in the probe or other projection-receiving recess, the finger or pawl is moveable against the action of a spring out of its position spacing the body and the at least one moveable arm whereby the at least one pivotable arm and thus the securing means is closed presenting no mouth opening or a mouth opening less than the width of the probe or other projection, and whereby when the moveable arm is pivoted to a position whereby the space between the body and moveable arm forming the mouth of the securing means is greater than the width of the probe or other projection for releasing the probe or other projection and whereby when the probe or other projection is released from the probe-receiving recess, the finger or pawl is restored to position with a portion thereof between the body and moveable arm so that when the probe or other projection is fully released and the arm moves towards the body and towards the other arm, the finger or pawl blocks engagement and further movement, thus returning the securing means to its normally partially opened position.

58. The securing means of claim 51, wherein the securing means comprises a body carrying a probe or other projection-receiving recess and a pair of arms extending laterally across the traverser on either side of the recess, at least one arm moveable towards the other arm, the at least one moveable arm being urged to a closed position to preclude the probe or other projection from leaving the recess when the securing means is closed, a finger or pawl secured to the body, at least one portion normally being positioned to extend between the at least one arm and the body and at least another portion extending into the probe or other projection-receiving recess whereat the securing means is in its normally partially opened position and whereby the mouth opening between the at least one moveable arm and other arm, the mouth is less than the width of the probe or other projection and when the probe or other projection is in the probe or other projection-receiving recess, the finger or pawl is moveable against the action of a spring out of its position spacing the body and the at least one moveable arm whereby the at least one privotable arm and thus the securing means is closed presenting no mouth opening or a mouth opening less than the width of the probe or other projection, and whereby when the moveable arm is pivoted to a position whereby the space between the body and moveable arm forming the mouth of the securing means is greater than the width of the probe or other projection for releasing the probe or other projection and whereby when the probe or other projection is released from the probe-receiving recess, the finger or pawl is restored to position with a portion thereof between the body and moveable arm so that when the probe or other projection is fully released and the arm moves towards the body and towards the other arm, the finger or pawl blocks engagement and further movement, thus returning the securing means to its normally partially opened position.

59. The securing means of claim 52, wherein the securing means comprises a body carrying a probe or other projection-receiving recess and a pair of arms extending laterally across the traverser on either side of the recess, at least one arm moveable towards the other arm, the at least one moveable arm being urged to a closed position to preclude the probe or other projection from leaving the recess when the securing means is closed, a finger or pawl secured to the body, at least one portion normally being positioned to extend between the at least one arm and the body and at least another portion extending into the probe or other projection-receiving recess whereat the securing means is in its normally partially opened position and whereby the mouth opening between the at least one moveable arm and other arm is less than the width of the probe or other projection and when the probe or other projection is in the probe or other projection-receiving recess, the finger or pawl is moveable against the action of a spring out ot its position spacing the body and the at least one moveable arm whereby the at least one pivotable arm and thus the securing means is closed presenting no mouth opening or a mouth opening less than the width of the probe or other projection, and whereby when the moveable arm is pivoted to a positon whereby the space between the body and moveable arm forming the mouth of the securing means is greater than the width of the probe or other projection for releasing the probe or other projection and whereby when the probe or other projection is released from the probe-receiving recess, the finger or pawl is restored to position with a portion thereof between the body and moveable arm so that when the probe or other projection is fully released and the arm moves towards the body and towards the other arm, the finger or pawl blocks engagement and further movement, thus returning the securing means to its normally partially opened position.

60. The helicopter rapid securing and traversing system of claim 37, wherein the securing means comprises a body carrying a probe or other projection-receiving recess and a pair of arms extending laterally across the traverser on either side of the recess, at least one arm moveable towards the other arm, the at least one moeable arm being urged to a closed position to preclude the probe or other projection from leaving the recess when the securing means is closed, and said means secured to the body comprises a finger or pawl secured to the body, at least one portion normally being positioned to extend between the at least one arm and the body and at least another portion extending into the probe or other projection-receiving recess whereat the securing means is in its normally partially opened position and whereby the mouth opening between the at least one moveable arm and other arm is less than the width of the probe or other projection and when the probe or other projection is in the probe or other projection-receiving recess, the finger or pawl is moveable against the action of a spring out of its position spacing the body and the at least one moveable arm whereby the at least one pivotable arm and thus the securing means is closed presenting no mouth opening or a mouth opening less than the width of the probe or other projection, and whereby when the moveable arm is pivoted to a position whereby the space between the body and moveable arm forming the mouth of the securing means is greater than the width of the probe or other projection for releasing the probe or other projection and whereby when the probe or other projection is released from the probe-receiving recess, the finger or pawl is restored to position with a portion thereof between the body and moveable arm so that when the probe or other projection is fully released and the arm moves towards the body and towards the other arm, the finger or pawl blocks engagement and further movement thus returning the securing means to its normally partially opened position.

61. The helicopter rapid securing and traversing system of claim 38, wherein the securing means comprises a body carrying a probe or other projection-receiving recess and a pair of arms extending laterally across the traverser on either side of the recess, at least one arm moveable towards the other arm, the at least one moveable arm being urged to a closed positio to preclude the probe or other projection from leaving the recess when the securing means is closed, a finger or pawl secured to the body, at least one portion normally being positioned to extend between the at least one arm and the body and at least another portion extending into the probe or other projection-receiving recess whereat the securing means is in its normally partially opened position and whereby the mouth opening between the at least one moveable arm and other arm is less than the width of the probe or other projection and when the probe or other projection is in the probe or other projection-receiving recess, the finger or pawl is moveable against the action of a spring out of its position spacing the body and the at least one moveable arm whereby the at least one pivotable arm and thus the securing means is closed presenting no mouth opening or a mouth opening less than the width of the probe or other projection, and whereby when the moveable arm is pivoted to a position whereby the space between the body and moveable arm forming the mouth of the securing means is greater than the width of the probe or other projection for releasing the probe or other projection and whereby when the probe or other projection is released from the probe-receiving recess, the finger or pawl is restored to position with a portion thereof between the body and moveable arm so that when the probe or other projection is fully released and the arm moves towards the body and towards the other arm, the finger or pawl blocks engagement and further movement thus returning the securing means to its normally partially opened position.

62. The helicopter rapid securing and traversing system of claim 39, wherein the securing means comprises a body carrying a probe or other projection-receiving recess and a pair of arms extending laterally across the traverser on either side of the recess, at least one arm moveable towards the other arm, the at least one moveable arm being urged to a closed position to preclude the probe or other projection from leaving the recess when the securing means is closed, a finger or pawl secured to the body, at least one portion normally being positioned to extend between the at least one arm and the body and at least another portion extending into the probe or other projection-receiving recess whereat the securing means is in its normally partially opened position and whereby the mouth opening between the at least one moveable arm and other arm is less than the width of the probe or other projection and when the probe or other projection is in the probe or other projection-receiving recess, the finger or pawl is moveable against the action of a spring out of its position spacing the body and the at least one moveable arm whereby the at least one pivotable arm and thus the securing means is closed presenting no mouth opening or a mouth opening less than the width of the probe or other projection, and whereby when the moveable arm is pivoted to a position whereby the space between the body and moveable arm forming the mouth of the securing means is greater than the width of the probe or other projection for releasing the probe or other projection and whereby when the probe or other projection is released from the probe-receiving recess, the finger or pawl is restored to position with a portion thereof between the body and moveable arm so that when the probe or other projection is fully released and the arm moves towards the body and towards the other arm, the finger or pawl blocks engagement and further movement thus returning the securing means to its normally partially opened position.

63. The helicopter rapid securing and traversing system of claim 40, wherein the securing means comprises a body carrying a probe or other projection-receiving recess and a pair of arms extending laterally across the traverser on either side of the recess, at least one arm moveable towards the other arm, the at least one moveable arm being urged to a closed position to preclude the probe or other projection from leaving the recess when the securing means is closed, a finger or pawl secured to the body, at least one portion normally being positioned to extend between the at least one arm and the body and at least another portion extending into the probe or other projection-receiving recess whereat the securing means is in its normally partially opened position and whereby the mouth opening between the at least one moveable arm and other arm is less than the width of the probe or other projection and when the probe or other projection is in the probe or other projection-receiving recess, the finger or pawl is moveable against the action of a spring out of its position spacing the body and the at least one moveable arm whereby the at least one pivotable arm and thus the securing means is closed presenting no mouth opening or a mouth opening less than the width of the probe or other projection, and whereby when the moveable arm is pivoted to a position whereby the space between the body and moveable arm forming the mouth of the securing means is greater than the width of the probe or other projection for releasing the probe or other projection and whereby when the probe or other projection is released from the probe-receiving recess, the finger or pawl is restored to position with a portion thereof between the body and moveable arm so that when the probe or other projection is fully released and the arm moves towards the body and towards the other arm, the finger or pawl blocks engagement and further movement thus returning the securing means to its normally partially opened position.

64. The helicopter rapid securing and traversing system of claim 41, wherein the securing means comprises a body carrying a probe or other projection-receiving recess and a pair of arms extending laterally across the traverser on either side of the recess, at least one arm moveable towards the other arm, the at least one moveable arm being urged to a closed position to preclude the probe or other projection from leaving the recess when the securing means is closed, a finger or pawl secured to the body, at least one portion normally being positioned to extend between the at least one arm and the body and at least another portion extending into the probe or other projection-receiving recess whereat the securing means is in its normally partially opened position and whereby the mouth opening between the at least one moveable arm and other arm is less than the width of the probe or other projection and when the probe or other projection is in the probe or other projection-receiving recess, the finger or pawl is moveable against the action of a spring out of its position spacing the body and the at least one moveable arm whereby the at least one pivotable arm and thus the securing means is closed presenting no mouth opening or a mouth opening less than the width of the probe or other projection, and whereby when the moveable arm is pivoted to a position whereby the space between the body and moveable arm forming the mouth of the securing means is greater than the width of the probe or other projection for releasing the probe or other projection and whereby when the probe or other projection is released from the probe-receiving recess, the finger or pawl is restored to position with a portion thereof between the body and a portion thereof between the body and moveable arm so that when the probe or other projection is fully released and the arm moves towards the body and towards the other arm, the finger or pawl blocks engagement and further movement thus returning the securing means to its normally partially opened position.

65. The helicopter rapid securing and traversing system of claim 42, wherein the securing means comprises a body carrying a probe or other projection-receiving recess and a pair of arms extending laterally across the traverser on either side of the recess, at least one arm moveable towards the other arm, the at least one moveable arm being urged to a closed position to preclude the probe or other projection from leaving the recess when the securing means is closed, a finger or pawl secured to the body, at least one portion normally being positioned to extend between the at least one arm and the body and at least another portion extending into the probe or other projection-receiving recess whereat the securing means is in its normally partially opened position and whereby the mouth opening between the at least one moveable arm and other arm is less than the width of the probe or other projection and when the probe or other projection is in the probe or other projection-receiving recess, the finger or pawl is moveable against the action of a spring out of its position spacing the body and the at least one moveable arm whereby the at least one pivotable arm and thus the securing means is closed presenting no mouth opening or a mouth opening less than the width of the probe or other projection, and whereby when the moveable arm is pivoted to a position whereby the space between the body and moveable arm forming the mouth of the securing means is greater than the width of the probe or other projection for releasing the probe or other projection and whereby when the probe or other projection is released from the probe-receiving recess, the finger or pawl is restored to position with a portion thereof between the body and moveable arm so that when the robe or other projection is fully released and the arm moves towards the body and towards the other arm, the finger or pawl blocks engagement and further movement thus returning the securing means to its normally partially opened position.

66. The helicopter rapid securing and traversing system of claim 43, wherein the securing means comprises a body carrying a probe or other projection-receiving recess and a pair of arms extending laterally across the traverser on either side of the recess, at least one arm moveable towards the other arm, the at least one moveable arm being urged to a closed position to preclude the probe or other projection from leaving the recess when the securing means is closed, a finger or pawl secured to the body, at least one portion normally being positioned to extend between the at least one arm and the body and at least another portion extending into the probe or other projection-receiving recess whereat the securing means is in its normally partially opened position and whereby the mouth opening between the at least one moveable arm and other arm is less than the width of the probe or other projection and when the probe or other projection is in the probe or other projection-receiving recess, the finger or pawl is moveable against the action of a spring out of its position spacing the body and the at least one moveable arm whereby the at least one pivotable arm and thus the securing means is closed presenting no mouth opening or a mouth opening less than the width of the probe or other projection, and whereby when the moveable arm is pivoted to a position whereby the space between the body and moveable arm forming the mouth of the securing means is greater than the width of the probe or other projection for releasing the probe or other projection and whereby when the probe or other projection is released from the probe-receiving recess, the finger or pawl is restored to position with a portion thereof between the body and moveable arm so that when the probe or other projection is fully released and the arm moves towards the body and towards the other arm, the finger or pawl blocks engagement and further movement thus returning the securing means to its normally partially opened position.

67. The helicopter rapid securing and traversing system of claim 44, wherein the securing means comprises a body carrying a probe or other projection-receiving recess and a pair of arms extending laterally across the traverser on either side of the recess, at least one arm moveable towards the other arm, the at least one moveable arm being urged to a closed position to preclude the probe or other projection from leaving the recess when the securing means is closed, a finger or pawl secured to the body, at least one portion normally being positioned to extend between the at least one arm and the body and at least another portion extending into the probe or other projection-receiving recess whereat the securing means is in its normally partially opened position and whereby the mouth opening between the at least one moveable arm and other arm is less than the width of the probe or other projection and when the probe or other projection is in the probe or other projection-receiving recess, the finger or pawl is moveable against the action of a spring out of its position spacing the body and the at least one moveable arm whereby the at least one pivotable arm and thus the securing means is closed presenting no mouth opening or a mouth opening less than the width of the probe or other projection, and whereby when the moveable arm is pivoted to a position whereby the space between the body and moveable arm forming the mouth of the securing means is greater than the width of the probe or other projection for releasing the probe or other projection and whereby when the probe or other projection is released from the probe-receiving recess, the finger or pawl is restored to position with a portion thereof between the body and moveable arm so that when the probe or other projection is fully released and the arm moves towards the body and towards the other arm, the finger or pawl blocks engagement and further movement thus returning the securing means to its normally partially opened position.

68. The helicopter rapid securing and traversing system of claim 45, wherein the securing means comprises a body carrying a probe or other projection-receiving recess and a pair of arms extending laterally across the traverser on either side of the recess, at least one arm moveable towards the other arm, the at least one moveable arm being urged to a closed position to preclude the probe or other projection from leaving the recess when the securing means is closed, a finger or pawl secured to the body, at least one portion normally being positioned to extend between the at least one arm and the body and at least another portion extending into the probe or other projection-receiving recess whereat the securing means is in its normally partially opened position and whereby the mouth opening between the at least one moveable arm and other arm is less than the width of the probe or other projection and when the probe or other projection is in the probe or other projection-receiving recess, the finger or pawl is moveable against the action of a spring out of its position spacing the body and the at least one moveable arm whereby the at least one pivotable arm and thus the securing means is closed presenting no mouth opening or a mouth opening less than the width of the probe or other projection, and whereby when the moveable arm is pivoted to a position whereby the space between the body and moveable arm forming the mouth of the securing means is greater than the width of the probe or other projection for releasing the probe or other projection and whereby when the probe or other projection is released from the probe-receiving recess, the finger or pawl is restored to position with a portion thereof between the body and moveable arm so that when the probe or other projection is fully released and the arm moves towards the body and towards the other arm, the finger or pawl blocks engagement and further movement thus returning the securing means to its normally partially opened position.

69. The securing means of claim 53, wherein the moveable arm is pivotably secured to the body.

70. The securing means of claim 54, wherein the moveable arm is pivotably secured to the body.

71. The securing means of claim 55, wherein the moveable arm is pivotably secured to the body.

72. The securing means of claim 56, wherein the moveable arm is pivotably secured to the body.

73. The securing means of claim 57, wherein the moveable arm is pivotably secured to the body.

74. The securing means of claim 58, wherein the moveable arm is pivotably secured to the body.

75. The helicopter rapid securing and traversing system of claim 59, wherein the moveable arm is pivotally secured to the body.

76. The helicopter rapid securing and traversing system of claim 60, wherein the moveable arm is pivotally secured to the body.

77. The helicopter rapid securing and traversing system of claim 61, wherein the moveable arm is pivotally secured to the body.

78. The helicopter rapid securing and traversing system of claim 62, wherein the moveable arm is pivotally secured to the body.

79. The helicopter rapid securing and traversing system of claim 63, wherein the moveable arm is pivotally secured to the body.

80. The helicopter rapid securing and traversing system of claim 64, wherein the moveable arm is pivotally secured to the body.

81. The helicopter rapid securing and traversing system of claim 65, wherein the moveable arm is pivotally secured to the body.

82. The helicopter rapid securing and traversing system of claim 66, wherein the moveable arm is pivotally secured to the body.

83. The helicopter rapid securing and traversing system of claim 67, wherein the moveable arm is pivotally secured to the body.

84. The securing means of claim 68, wherein each arm of the securing means carries at its leading end a sloped surface sloping towards the other arm and towards the rear of the body.

85. The securing means of claim 69, wherein each arm of the securing means carries at its leading end a sloped surface sloping towards the other arm and towards the rear of the body.

86. The securing means of claim 70, wherein each arm of the securing means carries at its leading end a sloped surface sloping towards the other arm and towards the rear of the body.

87. The securing means of claim 71, wherein each arm of the securing means carries at its leading end a sloped surface sloping towards the other arm and towards the rear of the body.

88. The securing means of claim 72, wherein each arm of the securing means carries a sloped front face sloping towards the other arm and towards the rear of the body.

89. The securing means of claim 73, wherein each arm of the securing means carries a sloped front face sloping towards the other arm and towards the rear of the body.

90. The helicopter rapid securing and traversing system of claim 74, wherein each arm of the securing means carries a sloped front face sloping towards the other arm and towards the rear of the body.

91. The helicopter rapid securing and traversing system of claim 75, wherein each arm of the securing means carries a sloped front face sloping towards the other arm and towards the rear of the body.

92. The helicopter rapid securing and traversing system of claim 76, wherein each arm of the securing means carries a sloped front face sloping towards the other arm and towards the rear of the body.

93. The helicopter rapid securing and traversing system of claim 77, wherein each arm of the securing means carries a sloped front face sloping towards the other arm and towards the rear of the body.

94. The helicopter rapid securing and traversing system of claim 78, wherein each arm of the securing means carries a sloped front face sloping towards the other arm and towards the rear of the body.

95. The helicopter rapid securing and traversing system of claim 79, wherein each arm of the securing means carries a sloped front face sloping towards the other arm and towards the rear of the body.

96. The helicopter rapid securing and traversing system of claim 80, wherein each arm of the securing means carries a sloped front face sloping towards the other arm and towards the rear of the body.

97. The helicopter rapid securing and traversing system of claim 81, wherein each arm of the securing means carries a sloped front face sloping towards the other arm and towards the rear of the body.

98. The helicopter rapid securing and traversing system of claim 82, wherein each arm of the securing means carries a sloped front face sloping towards the other arm and towards the rear of the body.

99. The securing means of claim 68, wherein the at least one pivotable arm is secured to means used for pulling it or pushing it towards and away from the body thus attempting to close and open it respectively, the means comprising a shaft carrying a slot in which a follower is carried, the follower being pivoted as the shaft moves with the arm from an open to closed position and vice versa, the follower carrying a non-circular opening through which a rod of like size and shape passes.

100. The securing means of claim 69, wherein the at least one pivotable arm is secured to means used for pulling it or pushing it towards and away from the body thus attempting to close and open it respectively, the means comprising a shaft carrying a slot in which a follower is carried, the follower being pivoted as the shaft moves with the arm from an open to closed position and vice versa, the follower carrying a non-circular opening through which a rod of like size and shape passès.

101. The securing means of claim 70, wherein the at least one pivotable arm is secured to means used for pulling it or pushing it towards and away from the body thus attempting to close and open it respectively, the means comprising a shaft carrying a slot in which a follower is carried, the follower being pivoted as the shaft moves with the arm from an open to closed position and vice versa, the follower carrying a non-circular opening through which a rod of like size and shape passes.

102. The securing means of claim 71, wherein the at least one pivotable arm is secured to means used for pulling it or pushing it towards and away from the body thus attempting to close and open it respectively, the means comprising a shaft carrying a slot in which a follower is carried, the follower being pivoted as the shaft moves with the arm from an open to closed position and vice versa, the follower carrying a non-circular opening through which a rod of like size and shape passes.

103. The securing means of claim 72, wherein the at least one pivotable arm is secured to means used for pulling it or pushing it towards and away from the body thus attempting to close and open it respectively, the means comprising a shaft carrying a slot in which a follower is carried, the follower being pivoted as the shaft moves with the arm from an open to closed position and vice versa, the follower carrying a non-circular opening through which a rod of like size and shape passes.

104. The securing means of claim 73, wherein the at least one pivotable arm is secured to means used for pulling it or pushing it towards and away from the body thus attempting to close and open it respectively, the means comprising a shaft carrying a slot in which a follower is carried, the follower being pivoted as the shaft moves with the arm from an open to closed position and vice versa, the follower carrying a non-circular opening through which a rod of like size and shape passes.

105. The securing means of claim 98, further comprising indicating means to indicate whether the securing means is open or closed.

106. The securing means of claim 99, further comprising indicating means to indicate whether the securing means is open or closed.

107. The securing means of claim 100, further comprising indicating means to indicate whether the securing means is open or closed.

108. The securing means of claim 101, further comprising indicating means to indicate whether the securing means is open or closed.

109. The securing means of claim 102, further comprising indicating means to indicate whether the securing means is open or closed.

110. The securing means of claim 103, further comprising indicating means to indicate whether the securing means is open or closed.

111. The securing means of claim 98, further comprising an activator engageable for rotating the rod, thus rotating the follower, shaft and thus the pivotable arm to open and close the securing means.

112. The securing means of claim 99, further comprising an activator engageable for rotating the rod, thus rotating the follower, shaft and thus the pivotable arm to open and close the securing means.

113. The securing means of claim 100, further comprising an activator engageable for rotating the rod, thus rotating the follower, shaft and thus the pivotable arm to open and close the securing means.

114. The securing means of claim 101, further comprising an activator engageable for rotating the rod, thus rotating the follower, shaft and thus the pivotable arm to open and close the securing means.

115. The securing means of claim 102, further comprising an activator engageable for rotating the rod, thus rotating the follower, shaft and thus the pivotable arm to open and close the securing means.

116. The securing means of claim 103, further comprising an activator engageable for rotating the rod, thus rotating the follower, shaft and thus the pivotable arm to open and close the securing means.

* * * * *

UNITED STATES PATENT AND TRADEMARK OFFICE
CERTIFICATE OF CORRECTION

PATENT NO. : 4,786,014

DATED : November 22, 1988

INVENTOR(S) : Mario Pesando and Boris Velman

Page 1 of 8

It is certified that error appears in the above-identified patent and that said Letters Patent is hereby corrected as shown below:

At column 4, line 40 after 'normally' and before 'opened', "partialy" should be corrected to read ---partially---;

At column 4, line 59 at the end of that line to the beginning of line 60, "diesngaged" should be corrected to read ---disengaged---.

In Claim 49 of the Patent at column 16, line 41 after 'claim' and before ', wherein', the number "36" should be changed to ---37---;

In Claim 50 of the Patent at column 16, line 45 after 'claim' and before ', wherein', the number "36" should be changed to ---37---;

In Claim 51 of the Patent at column 16, line 51 after 'The' and before 'of claim 48', the words "securing means" should be changed to ---helicopter rapid securing and traversing system---;

In Claim 54 of the Patent at column 17, line 1 after 'claim' and before ', wherein' the number "36" should be changed to ---37---;

UNITED STATES PATENT AND TRADEMARK OFFICE
CERTIFICATE OF CORRECTION

PATENT NO. : 4,786,014
DATED : November 22, 1988
INVENTOR(S) : Mario Pesando and Boris Velman It is certified that error appears in the above-identified patent and that said Letters Patent is hereby corrected as shown below:

In Claim 54 of the Patent at column 17, line 12 at the end of that line to the beginning of line 13, "receivin" should be corrected to read ---receiving---;

In Claim 54 of the Patent at column 17, line 18 after 'projection-' and before 'recess', "receivi" should be corrected to read ---receiving---, In Claim 55 of the Patent at column 17, line 38 after 'The' and before 'of claim 48', the words "securing means" should be changed to ---helicopter rapid securing and traversing system---;

In Claim 55 of the Patent at column 17, line 50 at the beginning of that line before 'recess', "receivin" should be corrected to read ---receiving---;

In Claim 56 of the Patent at column 18, line 19 at the beginning of that line before 'recess', "receivin" should be corrected to read ---receiving---;

In Claim 58 of the Patent at column 19, line 15 after 'The' and before 'of claim 51', the words "securing means" should be changed to ---helicopter rapid securing and traversing system---;

UNITED STATES PATENT AND TRADEMARK OFFICE
CERTIFICATE OF CORRECTION

PATENT NO. : 4,786,014

DATED : November 22, 1988

INVENTOR(S) : Mario Pesando and Boris Velman

It is certified that error appears in the above-identified patent and that said Letters Patent is hereby corrected as shown below:

In Claim 58 of the Patent at column 19, line 36 at the beginning of that line before 'arm and thus', "privotable" should be corrected to read ---pivotable---;

In Claim 59 of the Patent at column 20, line 4 after 'spring out' and before 'its position', "ot" should be corrected to read --of---;

In Claim 60 of the Patent at column 20, line 23 after 'of claim' and before ', wherein' the number "37" should be changed to ---36---;

In Claim 60 of the Patent at column 20, line 27 at the end of that line to the beginning of line 28, "moeable" should be corrected to read ---moveable---;

In Claim 61 of the Patent at column 20, line 67 after 'to a closed' and before 'to preclude the', "positio" should be corrected to read ---position---;

In Claim 65 of the Patent at column 23, line 43 at the beginning of that line before 'or other' the word "robe" should be corrected to read ---probe---;

UNITED STATES PATENT AND TRADEMARK OFFICE
CERTIFICATE OF CORRECTION

PATENT NO. : 4,786,014
DATED : November 22, 1988
INVENTOR(S) : Mario Pesando and Boris Velman It is certified that error appears in the above-identified patent and that said Letters Patent is hereby corrected as shown below:

In Claim 71 of the Patent at column 25, line 30 after 'The' and before 'of claim 55', the words "securing means" should be changed to ---helicopter rapid securing and traversing system---;

In Claim 74 of the Patent at column 25, line 36 after 'The' and before 'of claim 58', the words "securing means" should be changed to ---helicopter rapid securing and traversing system---;

In Claim 75 of the Patent at column 25, line 38 after 'The' and to line 39 before 'of claim 59 the words "helicopter rapid securing and traversing system" should be changed to ---securing means---;

In Claim 75 of the Patent at column 25, line 39 at the end of that line after 'moveable arm is', "pivotally" should be changed to ---pivotably---;

In Claim 76 of the Patent at column 25, line 42 at the end of that line after 'moveable arm is', "pivotally" should be changed to ---pivotably---;

In Claim 77 of the Patent at column 25, line 45 at the end of that line after 'moveable arm is', "pivotally" should be changed to ---pivotably---;

UNITED STATES PATENT AND TRADEMARK OFFICE
CERTIFICATE OF CORRECTION

PATENT NO. : 4,786,014

DATED : November 22, 1988

INVENTOR(S) : Mario Pesando and Boris Velman

Page 5 of 8

It is certified that error appears in the above-identified patent and that said Letters Patent is hereby corrected as shown below:

In Claim 78 of the Patent at column 25, line 48 at the end of that line after 'moveable arm is', "pivotally" should be changed to ---pivotably---;

In Claim 79 of the Patent at column 25, line 51 at the end of that line after 'moveable arm is', "pivotally" should be changed to ---pivotably---;

In Claim 80 of the Patent at column 25, line 54 at the end of that line after 'moveable arm is', "pivotally" should be changed to ---pivotably---;

In Claim 81 of the Patent at column 25, line 57 at the end of that line after 'moveable arm is', "pivotally" should be changed to ---pivotably---;

In Claim 82 of the Patent at column 25, line 60 at the end of that line after 'moveable arm is', "pivotally" should be changed to ---pivotably---;

In Claim 83 of the Patent at column 25, line 63 at the end of that line after 'moveable arm is', "pivotally" should be changed to ---pivotably---;

UNITED STATES PATENT AND TRADEMARK OFFICE
CERTIFICATE OF CORRECTION

PATENT NO. : 4,786,014
DATED : November 22, 1988
INVENTOR(S) : Mario Pesando and Boris Velman It is certified that error appears in the above-identified patent and that said Letters Patent is hereby corrected as shown below:

In Claim 84 of the Patent at column 25, line 65 after 'The' and before 'of claim 68', the words "securing means" should be changed to ---helicopter rapid securing and traversing system---;

In Claim 87 of the Patent at column 26, line 9 after 'The' and before 'of claim 71', the words "securing means" should be changed to ---helicopter rapid securing and traversing system---;

In Claim 91 of the Patent at column 26, line 25 after 'The' and to line 26 before 'of claim 75' the words "helicopter rapid securing and traversing system" should be changed to ---securing means---;

In Claim 92 of the Patent at column 26, line 29 after 'The' and to line 30 before 'of claim 76' the words "helicopter rapid securing and traversing system" should be changed to ---securing means---;

In Claim 99 of the Patent at column 26, line 57 after 'The' and before 'of claim 68', the words "securing means" should be changed to ---helicopter rapid securing and traversing system---;

In Claim 102 of the Patent at column 27, line 19 after 'The' and before 'of claim 71', the words "securing means" should be changed to ---helicopter rapid securing and traversing system---;

UNITED STATES PATENT AND TRADEMARK OFFICE
CERTIFICATE OF CORRECTION

PATENT NO. : 4,786,014          Page 7 of 8

DATED : November 22, 1988

INVENTOR(S) : Mario Pesando and Boris Velman

It is certified that error appears in the above-identified patent and that said Letters Patent is hereby corrected as shown below:

In Claim 105 of the Patent at column 28, line 3 after 'The' and before 'of claim 98', the words "securing means" should be changed to ---helicopter rapid securing and traversing system---;

In Claim 106 of the Patent at column 28, line 6 after 'The' and before 'of claim 99', the words "securing means" should be changed to ---helicopter rapid securing and traversing system---;

In Claim 109 of the Patent at column 28, line 15 after 'The' and before 'of claim 102', the words "securing means" should be changed to ---helicopter rapid securing and traversing system---;

In Claim 111 of the Patent at column 28, line 21 after 'The' and before 'of claim 98', the words "securing means" should be changed to ---helicopter rapid securing and traversing system---;

UNITED STATES PATENT AND TRADEMARK OFFICE
CERTIFICATE OF CORRECTION

PATENT NO. : 4,786,014

DATED : November 22, 1988

INVENTOR(S) : Mario Pesando and Boris Velman

Page 8 of 8

It is certified that error appears in the above-identified patent and that said Letters Patent is hereby corrected as shown below:

In Claim 112 of the Patent at column 28, line 25 after 'The' and before 'of claim 99', the words "securing means" should be changed to ---helicopter rapid securing and traversing system---;

In Claim 115 of the Patent at column 28, line 38 after 'The' and before 'of claim 102', the words "securing means" should be changed to ---helicopter rapid securing and traversing system---.

Signed and Sealed this

Fifth Day of November, 1991

Attest:

HARRY F. MANBECK, JR.

*Attesting Officer*   *Commissioner of Patents and Trademarks*